(12) United States Patent
Khalid

(10) Patent No.: US 12,262,216 B2
(45) Date of Patent: Mar. 25, 2025

(54) APPARATUS AND METHODS FOR SPECTRUM SCHEDULING IN HETEROGENEOUS WIRELESS NETWORKS

(71) Applicant: CHARTER COMMUNICATIONS OPERATING, LLC, St. Louis, MO (US)

(72) Inventor: Saran Khalid, Denver, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 18/100,160

(22) Filed: Jan. 23, 2023

(65) Prior Publication Data

US 2023/0156480 A1    May 18, 2023

Related U.S. Application Data

(63) Continuation of application No. 17/105,275, filed on Nov. 25, 2020, now Pat. No. 11,564,104.

(51) Int. Cl.
*H04W 16/14* (2009.01)
*H04W 72/0453* (2023.01)
(Continued)

(52) U.S. Cl.
CPC ....... *H04W 16/14* (2013.01); *H04W 72/0453* (2013.01); *H04W 72/1215* (2013.01);
(Continued)

(58) Field of Classification Search
CPC ............. H04W 16/14; H04W 72/0453; H04W 72/082; H04W 72/1215; H04W 72/1263; H04W 80/02
See application file for complete search history.

(56) References Cited

U.S. PATENT DOCUMENTS 5,991,308 A    11/1999    Fuhrmann et al.
5,995,499 A    11/1999    Hottinen et al.
(Continued)

FOREIGN PATENT DOCUMENTS

EP    2294860 A1    3/2011
GB    2585394 A    1/2021
(Continued)

OTHER PUBLICATIONS

Deering, S., et al., "Internet Protocol, Version 6 (IPv6) Specification," Internet Engineering Task Force (IETF) RFC 2460, Dec. 1998, 39 pages.
(Continued)

*Primary Examiner* — Mewale A Ambaye
(74) *Attorney, Agent, or Firm* — Patent Beach PC

(57) ABSTRACT

Apparatus and methods for coordinating operation of two or more wireless networks operating within a common area or venue. In one embodiment, the apparatus and methods provide mechanisms for scheduling access node(s) of one or more of the wireless networks relative to others of the networks so as to minimize interference or contention for common frequency resources (e.g., unlicensed spectrum such as that used by WLAN, NR-U or LTE-U technologies). In one variant, a network coordinator process generates schedule data that is pushed to one or more of the wireless networks that specifies temporal and spatial aspects wherein access nodes of the recipient one or more networks can operate (e.g., transmit) with suitable levels of interference from other wireless network(s) operating within the area or venue. The schedule data is separate from underlying protocol scheduling by the access nodes, thereby preserving all operational aspects of the underlying ireless protocols.

20 Claims, 16 Drawing Sheets

(51) Int. Cl.
   *H04W 72/12*      (2023.01)
   *H04W 72/1263*    (2023.01)
   *H04W 72/541*     (2023.01)
   *H04W 80/02*      (2009.01)

(52) U.S. Cl.
   CPC ..... *H04W 72/1263* (2013.01); *H04W 72/541* (2023.01); *H04W 80/02* (2013.01)

(56) References Cited

U.S. PATENT DOCUMENTS

| | | | |
|---|---|---|---|
| 6,154,648 | A | 11/2000 | Comer |
| 6,356,560 | B1 | 3/2002 | Venters et al. |
| 6,771,953 | B1 | 8/2004 | Chow et al. |
| 6,782,262 | B1 | 8/2004 | Lundborg |
| 7,269,151 | B2 | 9/2007 | Diener et al. |
| 7,573,819 | B2 | 8/2009 | Krzanowski et al. |
| 8,218,422 | B2 | 7/2012 | Venturino et al. |
| RE43,760 | E | 10/2012 | Abel et al. |
| 9,258,809 | B2 | 2/2016 | Liao et al. |
| 9,386,496 | B2 | 7/2016 | Gupta et al. |
| 9,473,957 | B2 | 10/2016 | Wellington |
| 9,526,056 | B2 | 12/2016 | Tomici et al. |
| 9,699,663 | B1 | 7/2017 | Jovancevic |
| 9,769,692 | B2 | 9/2017 | Freda et al. |
| 9,807,778 | B2 | 10/2017 | Ma et al. |
| 9,813,148 | B2 | 11/2017 | Syed et al. |
| 9,887,864 | B1 | 2/2018 | Han et al. |
| 9,986,578 | B2 | 5/2018 | Gunasekara |
| 10,003,548 | B2 | 6/2018 | Lee et al. |
| 10,033,505 | B2 | 7/2018 | Malladi et al. |
| 10,098,568 | B2 | 10/2018 | Gazdzinski |
| 10,135,730 | B2 | 11/2018 | Chou |
| 10,164,858 | B2 | 12/2018 | Gunasekara et al. |
| 10,340,976 | B2 | 7/2019 | Kakinada et al. |
| 10,368,255 | B2 | 7/2019 | Gunasekara et al. |
| 10,368,361 | B2 | 7/2019 | Huang |
| 10,405,192 | B2 | 9/2019 | Kakinada et al. |
| 10,484,876 | B2 | 11/2019 | Shah et al. |
| 10,492,204 | B2 | 11/2019 | Kakinada et al. |
| 10,499,409 | B2* | 12/2019 | Shattil .................. H04W 76/14 |
| 10,506,456 | B2 | 12/2019 | Lou et al. |
| 10,531,309 | B1 | 1/2020 | Li et al. |
| 10,536,859 | B2 | 1/2020 | Gunasekara et al. |
| 10,560,772 | B2 | 2/2020 | Gunasekara |
| 10,624,079 | B2 | 4/2020 | Xu et al. |
| 10,638,361 | B2 | 4/2020 | Gunasekara et al. |
| 10,645,547 | B2 | 5/2020 | Gunasekara et al. |
| 10,680,883 | B2 | 6/2020 | Hall et al. |
| 10,750,462 | B2 | 8/2020 | Kadambar et al. |
| 10,764,841 | B2 | 9/2020 | Syed et al. |
| 10,805,562 | B2 | 10/2020 | Nakamura et al. |
| 10,945,161 | B2 | 3/2021 | Syed et al. |
| 10,945,250 | B2 | 3/2021 | Kwon et al. |
| 10,980,025 | B2 | 4/2021 | Hmimy et al. |
| 11,026,205 | B2 | 6/2021 | Hmimy et al. |
| 11,129,171 | B2 | 9/2021 | Hmimy |
| 11,190,861 | B2 | 11/2021 | Bali |
| 11,317,296 | B2 | 4/2022 | Vaidya et al. |
| 11,363,466 | B2 | 6/2022 | Khalid et al. |
| 11,432,284 | B2 | 8/2022 | Hmimy et al. |
| 11,438,771 | B2 | 9/2022 | Syed et al. |
| 11,457,485 | B2 | 9/2022 | Khalid et al. |
| 11,483,715 | B2 | 10/2022 | Sevindik et al. |
| 2002/0126748 | A1 | 9/2002 | Rafie et al. |
| 2004/0001021 | A1 | 1/2004 | Choo et al. |
| 2004/0196834 | A1 | 10/2004 | Ofek et al. |
| 2006/0188004 | A1 | 8/2006 | Kizu et al. |
| 2008/0097913 | A1 | 4/2008 | Dicks et al. |
| 2008/0220786 | A1 | 9/2008 | Beacham |
| 2008/0220788 | A1 | 9/2008 | Stanwood et al. |
| 2009/0028182 | A1 | 1/2009 | Brooks et al. |
| 2009/0034443 | A1 | 2/2009 | Walker et al. |
| 2009/0129273 | A1 | 5/2009 | Zou |
| 2009/0170472 | A1 | 7/2009 | Chapin et al. |
| 2009/0253438 | A1 | 10/2009 | Chater-Lea et al. |
| 2010/0035611 | A1 | 2/2010 | Montojo et al. |
| 2010/0094956 | A1 | 4/2010 | Zuckerman et al. |
| 2010/0128608 | A1* | 5/2010 | Zou .................. H04W 36/06 370/237 |
| 2010/0234042 | A1* | 9/2010 | Chan ............... H04W 36/0061 455/453 |
| 2011/0014924 | A1 | 1/2011 | Hwang et al. |
| 2011/0292970 | A1 | 12/2011 | Lansford et al. |
| 2012/0188877 | A1 | 7/2012 | Chin et al. |
| 2013/0039200 | A1 | 2/2013 | Park et al. |
| 2013/0122903 | A1 | 5/2013 | Farnsworth et al. |
| 2013/0182602 | A1 | 7/2013 | Lee et al. |
| 2013/0279376 | A1 | 10/2013 | Ahmadi |
| 2013/0281092 | A1 | 10/2013 | Gassend |
| 2013/0288675 | A1 | 10/2013 | Gassend |
| 2013/0303145 | A1 | 11/2013 | Harrang et al. |
| 2013/0315124 | A1 | 11/2013 | Rapaport et al. |
| 2013/0336175 | A1 | 12/2013 | Um et al. |
| 2014/0106672 | A1 | 4/2014 | Jeon et al. |
| 2014/0194068 | A1 | 7/2014 | Coppage et al. |
| 2014/0199991 | A1 | 7/2014 | Mukherjee et al. |
| 2014/0241187 | A1 | 8/2014 | Barkay et al. |
| 2014/0269526 | A1 | 9/2014 | Mitola, III |
| 2014/0308986 | A1 | 10/2014 | Yang et al. |
| 2015/0055623 | A1 | 2/2015 | Li et al. |
| 2015/0071239 | A1 | 3/2015 | Zhang et al. |
| 2015/0133173 | A1 | 5/2015 | Edge et al. |
| 2015/0139175 | A1 | 5/2015 | Ratasuk et al. |
| 2015/0181546 | A1 | 6/2015 | Freda et al. |
| 2015/0181589 | A1 | 6/2015 | Luo et al. |
| 2015/0208262 | A1 | 7/2015 | Siomina |
| 2015/0280847 | A1 | 10/2015 | Somasundaram et al. |
| 2015/0304856 | A1 | 10/2015 | Garcia et al. |
| 2015/0334664 | A1 | 11/2015 | Sawai et al. |
| 2015/0341753 | A1 | 11/2015 | Chen et al. |
| 2016/0007147 | A1 | 1/2016 | Zhang et al. |
| 2016/0021661 | A1 | 1/2016 | Yerramalli et al. |
| 2016/0073259 | A1 | 3/2016 | Lee et al. |
| 2016/0128001 | A1 | 5/2016 | Tsuda |
| 2016/0165066 | A1 | 6/2016 | Yang et al. |
| 2016/0182134 | A1* | 6/2016 | Kol .................. H04B 1/7107 370/329 |
| 2016/0212031 | A1 | 7/2016 | Jain et al. |
| 2016/0234746 | A1 | 8/2016 | Gopal et al. |
| 2016/0269978 | A1* | 9/2016 | Bashar ................. H04W 48/12 |
| 2016/0330743 | A1 | 11/2016 | Das et al. |
| 2016/0381600 | A1 | 12/2016 | Aksu |
| 2017/0013422 | A1 | 1/2017 | Saiwai et al. |
| 2017/0013479 | A1 | 1/2017 | Sun et al. |
| 2017/0026203 | A1 | 1/2017 | Thomas et al. |
| 2017/0150523 | A1 | 5/2017 | Patel et al. |
| 2017/0155703 | A1 | 6/2017 | Hao et al. |
| 2017/0164326 | A1 | 6/2017 | Worrall |
| 2017/0188241 | A1 | 6/2017 | Mueck et al. |
| 2017/0208540 | A1 | 7/2017 | Egner et al. |
| 2017/0208560 | A1* | 7/2017 | Papa .................. H04W 56/006 |
| 2017/0272955 | A1 | 9/2017 | Sadek et al. |
| 2017/0295497 | A1 | 10/2017 | MacMullan et al. |
| 2017/0295578 | A1 | 10/2017 | Khoshnevisan et al. |
| 2017/0303138 | A1 | 10/2017 | Barmettler et al. |
| 2017/0311290 | A1 | 10/2017 | Adjakple et al. |
| 2017/0318472 | A1 | 11/2017 | Yu et al. |
| 2017/0325251 | A1* | 11/2017 | Sadek ............... H04W 72/1215 |
| 2018/0007587 | A1 | 1/2018 | Feldman et al. |
| 2018/0035463 | A1 | 2/2018 | Mallik et al. |
| 2018/0049036 | A1 | 2/2018 | Sethi et al. |
| 2018/0063736 | A1 | 3/2018 | Sadeghi et al. |
| 2018/0063758 | A1 | 3/2018 | Velu |
| 2018/0107577 | A1 | 4/2018 | Johnsson et al. |
| 2018/0115903 | A1 | 4/2018 | Badic et al. |
| 2018/0124613 | A1 | 5/2018 | Kang et al. |
| 2018/0132112 | A1 | 5/2018 | Khoshnevisan et al. |
| 2018/0146058 | A1 | 5/2018 | Somayazulu et al. |
| 2018/0146408 | A1 | 5/2018 | Meylan et al. |
| 2018/0167948 | A1 | 6/2018 | Egner et al. |
| 2018/0199214 | A1 | 7/2018 | Shen |
| 2018/0234403 | A1 | 8/2018 | Casella et al. |
| 2018/0235007 | A1 | 8/2018 | Gou et al. |

(56) References Cited

U.S. PATENT DOCUMENTS

| | | |
|---|---|---|
| 2018/0242184 A1 | 8/2018 | Yerramalli et al. |
| 2018/0255576 A1 | 9/2018 | Bhorkar et al. |
| 2018/0279212 A1 | 9/2018 | Malik et al. |
| 2018/0316563 A1 | 11/2018 | Kumar et al. |
| 2018/0323938 A1 | 11/2018 | Takeda et al. |
| 2019/0021012 A1 | 1/2019 | Beck et al. |
| 2019/0028182 A1 | 1/2019 | Smyth et al. |
| 2019/0037480 A1 | 1/2019 | Sun et al. |
| 2019/0044614 A1 | 2/2019 | Khoshnevisan et al. |
| 2019/0081690 A1 | 3/2019 | Mueck et al. |
| 2019/0082447 A1 | 3/2019 | Harsha et al. |
| 2019/0098510 A1 | 3/2019 | Guo et al. |
| 2019/0098632 A1 | 3/2019 | Martin et al. |
| 2019/0104551 A1 | 4/2019 | Deenoo et al. |
| 2019/0132882 A1 | 5/2019 | Li et al. |
| 2019/0150182 A1 | 5/2019 | Koorapaty et al. |
| 2019/0150190 A1 | 5/2019 | Kim et al. |
| 2019/0182895 A1 | 6/2019 | Di Girolamo et al. |
| 2019/0222266 A1 | 7/2019 | Cui et al. |
| 2019/0223180 A1 | 7/2019 | Fehrenbach et al. |
| 2019/0230613 A1 | 7/2019 | Kim et al. |
| 2019/0239190 A1 | 8/2019 | Patel et al. |
| 2019/0253878 A1 | 8/2019 | Yu et al. |
| 2019/0296789 A1 | 9/2019 | Yu et al. |
| 2019/0319699 A1 | 10/2019 | Lee et al. |
| 2019/0319814 A1 | 10/2019 | Das |
| 2019/0320490 A1 | 10/2019 | Liu et al. |
| 2019/0349848 A1 | 11/2019 | Bali |
| 2019/0364565 A1 | 11/2019 | Hmimy et al. |
| 2019/0373615 A1 | 12/2019 | Cimpu et al. |
| 2019/0394790 A1 | 12/2019 | Damnjanovic et al. |
| 2020/0021689 A1 | 1/2020 | Sultana et al. |
| 2020/0025629 A1 | 1/2020 | Zinger et al. |
| 2020/0053545 A1 | 2/2020 | Wong et al. |
| 2020/0083892 A1 | 3/2020 | Kundu et al. |
| 2020/0084759 A1 | 3/2020 | Liu et al. |
| 2020/0146058 A1 | 5/2020 | Xu et al. |
| 2020/0187150 A1 | 6/2020 | Eisner |
| 2020/0221392 A1 | 7/2020 | Xue et al. |
| 2020/0252933 A1 | 8/2020 | Hmimy et al. |
| 2020/0275457 A1 | 8/2020 | Hmimy |
| 2020/0296627 A1 | 9/2020 | Arvidson et al. |
| 2020/0313838 A1 | 10/2020 | Jin et al. |
| 2020/0337054 A1 | 10/2020 | Kwok et al. |
| 2020/0344515 A1 | 10/2020 | Wong et al. |
| 2021/0037444 A1 | 2/2021 | Harel |
| 2021/0051653 A1 | 2/2021 | Park et al. |
| 2021/0058863 A1 | 2/2021 | Kalhan |
| 2021/0076424 A1 | 3/2021 | Mukherjee et al. |
| 2021/0105633 A1 | 4/2021 | Vaidya et al. |
| 2021/0126662 A1 | 4/2021 | Solichien |
| 2021/0127423 A1 | 4/2021 | Park et al. |
| 2021/0136838 A1 | 5/2021 | Khalid et al. |
| 2021/0167883 A1 | 6/2021 | Yoon |
| 2021/0204322 A1 | 7/2021 | Lou et al. |
| 2021/0211887 A1 | 7/2021 | Jones |
| 2021/0219303 A1 | 7/2021 | Khalid et al. |
| 2021/0235495 A1 | 7/2021 | Xu et al. |
| 2021/0266914 A1 | 8/2021 | Yoo et al. |
| 2021/0274506 A1 | 9/2021 | Raghavan et al. |
| 2021/0376905 A1 | 12/2021 | Zhou et al. |
| 2022/0007200 A1 | 1/2022 | Sevindik et al. |
| 2022/0007374 A1 | 1/2022 | Sevindik et al. |
| 2022/0132524 A1 | 4/2022 | Mueck et al. |
| 2022/0183093 A1 | 6/2022 | Sevindik et al. |
| 2022/0191675 A1 | 6/2022 | Mukherjee |
| 2022/0407653 A1 | 12/2022 | Kakishima et al. |
| 2023/0012713 A1 | 1/2023 | Khalid et al. |

FOREIGN PATENT DOCUMENTS

| | | |
|---|---|---|
| WO | WO-2005065198 A2 | 7/2005 |
| WO | WO-2013020599 A1 | 2/2013 |
| WO | WO-2017130494 A1 | 8/2017 |
| WO | WO-2017186294 A1 | 11/2017 |
| WO | WO-2018144976 A2 | 8/2018 |
| WO | WO-2019139691 A1 | 7/2019 |

OTHER PUBLICATIONS

IEEE Std. 802.11 or related standards including 802.11a/b/g/n/s/v/ac/ad/ax/ay/ba/be or 802.11-2012/2013, 802.11-2016.

"Internet Protocol, DARPA Internet Program, Protocol Specification", IETF RCF 791, Sep. 1981, 50 pages.

Palola M., et al., "Field Trial of the 3.5 GHz Citizens Broadband Radio Service Governed by a Spectrum Access System (SAS)," IEEE International Symposium on Dynamic Spectrum Access Networks, 2017, 9 pages.

Schwengler, Thomas, "Wireless and Cellular Communications", First Edition, Dec. 2019.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.

Souryal, Michael R., et al., "Effect of Federal Incumbent Activity on CBRS Commercial Service", International Symposium on Dynamic Spectrum Access Networks (DySPAN), IEEE 2019, 5 pages.

Wi-Fi Direct, "Wi-Fi Peer-to-Peer (P2P) Specification," Wi-Fi Alliance, Version 1.5, 2014, 183 pages.

Kulacz L., et al., "Coordinated Spectrum Allocation and Co existence Management in CBRS-SAS Wireless Networks." IEEE Access, vol. 07, pp. 139294-139316. (Year: 2019).

* cited by examiner

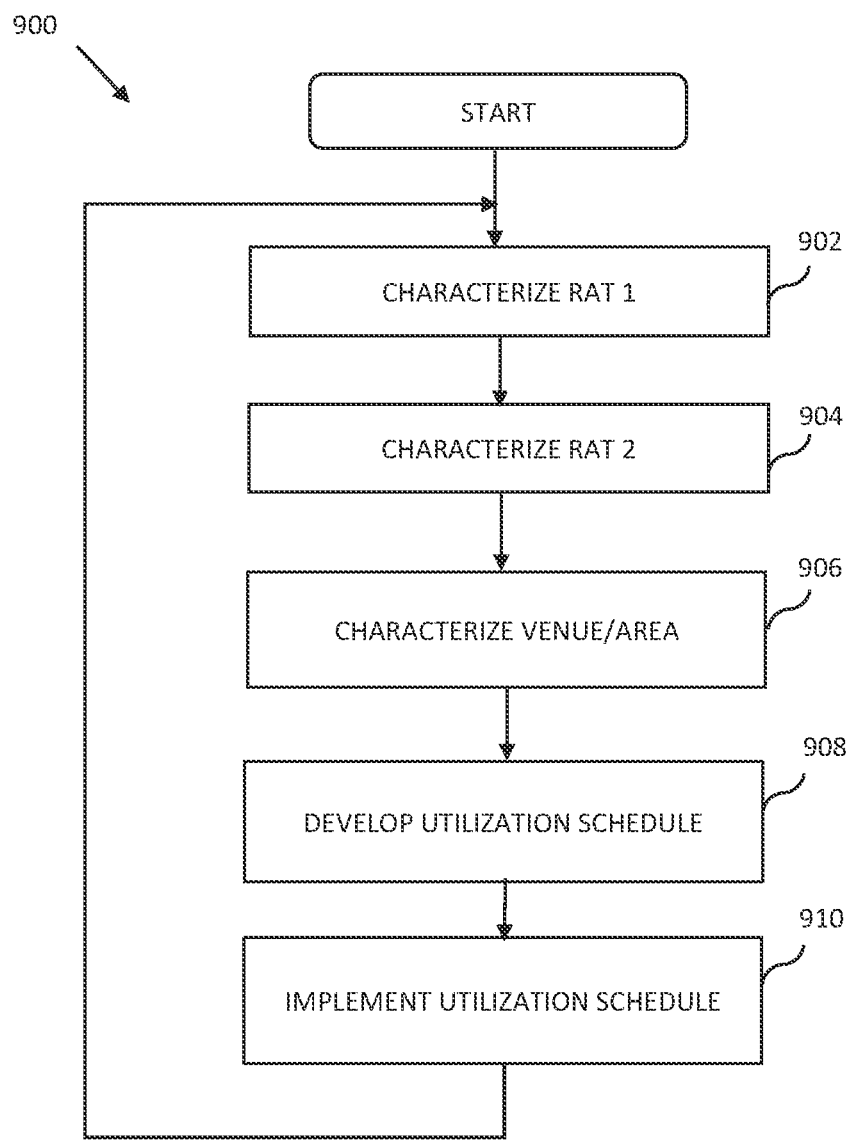

APPARATUS AND METHODS FOR SPECTRUM SCHEDULING IN HETEROGENEOUS WIRELESS NETWORKS

PRIORITY

This application is a continuation of, and claims priority to, co-owned and co-pending U.S. patent application Ser. No. 17/105,275 of the same title filed on Nov. 25, 2020, and issuing as U.S. Pat. No. 11,564,104 on Jan. 24, 2023, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect to enhancing scheduling of users of unlicensed or quasi-licensed spectrum, including across different types of access technologies.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA + up to 21 Mbit/s). |
|  | 1900 MHz PCS, Band 2 (UMTS/HSPA + up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
| --- | --- | --- | --- | --- |
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service |

TABLE 2-continued

| Frequency range | Type | Center frequency | Availability | Licensed users |
|---|---|---|---|---|
| 61 GHz-61.5 GHz | A | 61.25 GHz | Subject to local acceptance | (active) Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to routers, APs, etc. that are within wireless range.

LTE and 5G New Radio (NR)

Long Term Evolution (LTE) and its related variants (i.e., LTE-A, LTE-LAA, LTE-U, etc.) is a mature 3GPP-based technology now widely deployed by various cellular service providers, as well as within certain non-licensed uses (e.g., as an underpinning of many CBRS or other systems).

NG-RAN or "NextGen RAN (Radio Area Network)" is part of the 3GPP "5G" next generation radio system. 3GPP is currently specifying Release 17 (aka "Rel-17") NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

5G NR key aspects were originally specified in 3GPP Release 15 (Rel-15) NG-RAN (and further refined in follow-on Release 16). For instance, low latency communication, beam-based channels, massive Multiple Input Output (MIMO) with large numbers of controllable antenna elements, scalable-width subchannels, carrier aggregation, cloud Radio-Access Network (RAN) capability, network slicing, and coexistence with LTE were first specified in Release 15.

In some aspects, Rel-17 NG-RAN leverages technology and functions of extant LTE/LTE-A (colloquially referred to as 4G or 4.5G), as bases for further functional development and capabilities. For instance, Rel-17 is bringing foundational enhancements to improve overall network capacity, coverage, latency, device power, and mobility. In Rel-17, there will be a focus on massive MIMO (mMIMO), beam management, for mmWave, multi-transmission-point operations, higher mobility. In addition, Rel-17 will provide support for Multi-Universal Subscriber Identity (UE) MUSIM UEs. FIG. 1 illustrates the 3GPP 5G NR architecture 100.

FIG. 2 shows the 4G architecture at a high level, as well as architecture specified for interworking between 5GS and EPC/E-UTRAN as defined in TS 23.501, specifically the non-roaming architecture for interworking between the 5GS and the EPC/E-UTRAN. Two different RAN technologies are supported in this architecture 200; i.e., E-UTRAN (4G/4.5G) 202, and 5G (NG-RAN) 204.

Unlicensed Spectrum and Shared Access Systems

As alluded to above, wireless data services of varying types are now ubiquitous. Such wireless services may include for instance (i) "licensed" service, such as cellular service provided by a mobile network operator (MNO), (ii) quasi-licensed (e.g., "shared" spectrum which in some cases may be withdrawn, such as CBRS), (iii) unlicensed (such as Wi-Fi (IEEE Std. 802.11) and "unlicensed cellular" technologies such as LTE-U/LAA or NR-U, as well as IoT (Internet of Things) services.

One common model is to provide localized unlicensed "small cell" (e.g., 3GPP "femtocell") coverage via a service provider such as a terrestrial fiber or cable MSO. These small cells can leverage e.g., 3GPP unlicensed bands (such as NR-U bands in the 5 GHz range) or other spectrum such as CBRS (3.550-3.70 GHz, 3GPP Band 48) with GAA (general access) spectrum which is in effect unlicensed, and C-Bands (3.30-5.00 GHz). Technologies for use of other bands such as 6 GHz band (5.925-7.125 GHz such as for Wi-Fi-6), and even mmWave bands (e.g., 24 GHz and above) are also under development and expected to be widely deployed in coming years.

Small cells offer great flexibility for providing effectively shared-access cellular coverage without the CAPEX and other considerations associated with a normal licensed cellular (e.g., 3GPP NodeB) deployment. Since small cells are designed to service fewer users/throughput, they can also be backhauled by many existing and commonly available forms of infrastructure, such as coaxial cable networks currently managed and operated by cable MSOs. Advantageously, there is a very large base of installed coaxial cable in the U.S. (and other countries), and the cable medium itself is capable of appreciable bandwidth, especially with more recent upgrades of the backhaul infrastructure supporting the coaxial cable "last mile" (e.g., DWDM optical distribution networks, high-speed DOCSIS modem protocols, and converged/edge cable platforms such as CCAP).

Hence, cable MSOs have more recently begun deploying "small cells" (such as CBRS CBSDs) for their enterprise and residential customers in order to provide wireless coverage and backhaul, whether in high-density urban applications, suburban applications, and even low-density rural applications. For instance, in rural applications, such wireless cells in effect greatly extend the last mile of installed cable, providing a wireless backhaul for e.g., residential CPE which could otherwise not be serviced due to lack of a coaxial cable. Conversely, in urban applications, wireless coverage may be spotty due to e.g., large buildings and other infrastructure, and poor coverage can affect large numbers of users due to their higher geographical/spatial density, thereby necessitating small cell use. Common to all of these deployment scenarios is the managed backhaul (e.g., cable) network.

As noted above, unlicensed and shared access spectrum is an attractive deployment option, in that it does not require purchasing spectrum as in licensed spectrum deployments. However, as anyone can transmit within unlicensed spectrum bands at any given time, unlicensed channels may become crowded in a very short amount of time. This phenomenon further tends to be exacerbated over time; when a new band is made available, initially the population of users is smaller, until the technology needed to utilize the new bands becomes more pervasive (in effect, the technology lags by a period). This crowding by various parties trying to access the spectrum results in an un-coordinated utilization of the spectrum, which produces poor utilization of available bandwidth and hence poor spectrum efficiency. Losses in efficiency can result from, inter alia, necessitation of medium access protocols such as LBT (listen-before-talk) as required under recent 5G NR-U standards, or other contention-based mechanisms such a CSMA-CD (carrier sense multiple access with collision detection). Such mechanisms can starve some technologies of bandwidth and limit the number of users who can access the spectrum, and/or may result in poor performance due to latency, degraded throughput performance and delayed delivery of prioritized traffic (e.g., traffic with certain QoS or other requirements such as voice or video traffic).

Moreover, within the defined limits for transmission power (e.g., EIRP) and other conditions mandated for example by the FCC in the United States, there are usually multiple parties transmitting within the same bandwidth and in fact, using different radio access technologies such as 3GPP-based systems (e.g., LTE-U/LAA, NR-U) and Wi-Fi. These different technologies transmitting in the same band is un-coordinated due to inherent differences in the technologies such as timing schemes, use of TDD vs. FDD, use of carrier aggregation (CA), and any number of other factors (aside from any explicit coordination mechanisms between the different technologies).

Notably, most consumer devices currently include multi-RAT capability; e.g.; the capability to access multiple different RATs, whether simultaneously, or in a "fail over" manner (such as via a wireless connection manager process running on the device). For example, a smartphone may be enabled for LTE data access, but when unavailable, utilize one or more Wi-Fi technologies (e.g., 802.11g/n/ac/ax) for data communications.

The capabilities of different RATs (such as LTE and Wi-Fi) regarding establishment of wireless service to a given client device can also be very different. For example, there is a disparity between the signal strength threshold for initializing a connection via Wi-Fi vs. LTE (including LTE-U and LTE-LAA). As a brief aside, LTE-U enables data communication via LTE in an unlicensed spectrum (e.g., 5 GHz) to provide additional radio spectrum for data transmission (e.g., to compensate for overflow traffic). LTE-LAA uses carrier aggregation to combine LTE in unlicensed spectrum (e.g., 5 GHz) with the licensed band.

Typical levels of signal strength required for LTE-U or LTE-LAA service are approximately −80 to −84 dBm. In comparison, Wi-Fi can be detected by a client device based on a signal strength of approximately −72 to −80 dBm, i.e., a higher (i.e., less sensitive) detection threshold. Moreover, the mechanisms for connecting to various types of RATs may vary in their protocol, including what is colloquially referred to as "politeness." For instance, a Wi-Fi connection protocol may be structured to be unobtrusive when in the presence of other RATs such that the other RATs will preferentially connect before Wi-Fi. This is particularly true where the RF signal strength levels for the various RATs are generally of similar magnitude (i.e., such that no particular RAT "stands out").

When a client device is in an environment where coexisting LTE and Wi-Fi services are available for connection to a network (e.g., public venues), the client device may automatically and/or persistently prioritize a connection to LTE providers despite the presence of nearby existing Wi-Fi equipment (e.g., an AP providing network connectivity via Wi-Fi). Specifically, if LTE and Wi-Fi services are available on the same operating frequency band (e.g., 5 GHz), the client device may connect via LTE by virtue of its relatively aggressive connection mechanism, even when it is not the intention of the user. For instance, the user may be under a service contract with one or more LTE carriers that may charge access fees or count LTE "data" consumption against a limited quota, and hence desire to use Wi-Fi (and its corresponding unlimited data) when at all possible. Other instances where Wi-Fi is required or heavily preferred may include, inter alia, (i) for conservation of battery power at low reserves, (ii) when consuming data services over a comparatively long period of time (e.g., voice-over-IP (VoIP) calls, video chats, or large data transfers), and/or (iii) for access to services particular to a service provider of which the user is a subscriber (including for use of a software application specifically designed for use by the service provider). The user may also prefer a consistent connection to avoid discontinuities associated with handovers between LTE nodes (cell towers, small cells, eNBs (evolved NodeBs), base stations, etc.).

Moreover, when LTE or other RAT connectivity is prioritized by the user's mobile devices, some service providers (e.g., cable network operators) cannot provide services to their existing subscribers or capture new ad hoc users as effectively within public venues as compared to use of Wi-Fi.

In addition to the differences in their relative propensity for connection, cellular and e.g., WLAN technologies may also employ other mechanisms to enhance spectral use efficiency. For example, technologies such as dynamic TDD in 3GPP LTE and NR standards attempt to allow greater flexibility in "repurposing" UL and DL slot structures depending on factors such as then-prevailing load and channel conditions, However, these mechanisms do not address the extant lack of inter-RAT coordination, especially in the unlicensed "free for all" bands where both cellular and WLAN or similar non-cellular technologies are present. Other features such as Dynamic spectrum sharing (DSS) for NR-LTE coexistence (when both access technologies are deployed on a shared carrier in 3GPP NR FR1) ostensibly enhance efficiency and scalability with varying LTE and NR traffic loads, but again do not address issues presented by heterogeneous technologies (e.g., 3GPP-based and non-3GPP-based) operated together, especially within unlicensed bands such as those specified by NR-U.

Accordingly, improved methods and apparatus are needed to address the foregoing issues, including providing at least some level of coordination between RATs within unlicensed or similar types of spectrum applications, so as to increase spectral use efficiency and also ensure one technology is not "blocked" out unduly by another more aggressive technology operating within the same area (which include situations where each technology is deployed by the same or a different network operator).

SUMMARY

The present disclosure addresses the foregoing needs by providing, inter alia, apparatus and methods for enhanced coordination between wireless network access technologies (including those having heterogeneous RATs).

In a first aspect of the disclosure, a method of operating a network comprising first and second wireless radio area technologies (RATs) is disclosed. In one embodiment, the method includes: identifying one or more spatial regions where at least one or contention or interference between the first and second wireless RATs exists or will exist; and based at least on the identifying, applying a time-based schedule to at least one of the first wireless RAT or second wireless RAT such that at least a portion of the at least one contention or interference is avoided within the identified one or more spatial regions.

In one variant of the method, the one or more spatial regions are disposed within at least one of a prescribed area or venue, and the first wireless RAT and second wireless RAT comprise different wireless protocols that are incompatible with one another.

In one implementation thereof, the first wireless RAT and second wireless RAT are each configured to operate in a common frequency band. In another implementation, the common frequency band includes an unlicensed frequency band; the first and second wireless RATs each comprise one or more respective medium access protocols useful in access of the common frequency band; and the applying the time-based schedule obviates use of the respective one or more medium access protocols for at least one of the first and second wireless RATs.

In another variant, the first wireless access technology includes at least one of a 3GPP (Third Generation Partnership Project) LTE (Long Term Evolution) technology or a 3GPP 5G NR (Fifth Generation New Radio) technology, and the second wireless access technology includes a Wi-Fi (IEEE Std. 802.11) based technology.

In a further variant, the method of operating the network includes a method of operating performed by a common network operator responsible for both the first wireless RAT and the second wireless RAT, and the common network operator includes a cable MSO (multiple systems operator). For instance, at least one of the first wireless RAT and the second wireless RAT are backhauled to at least a core network of the MSO by one or more DOCSIS (data over cable service interface specification) infrastructure.

In still another variant, the method further includes: identifying one or more second spatial regions where the at least one of contention or interference is below a prescribed threshold; and excluding the identified second spatial regions from further evaluation.

In yet a further variant, the method further includes iteratively performing said identifying one or more spatial regions and said applying a time-based schedule, each iteration based at least in part on one or more data parameter relating to one or more of the first or second wireless RATs that has been updated since an immediately prior iteration.

In another variant, the one or more spatial regions are disposed within at least one of a prescribed area or venue; and the identifying one or more spatial regions where at least one or contention or interference between the first and second wireless RATs exists or will exist includes: obtaining a heat map for at least portions of the prescribed area or venue; algorithmically applying a grid scheme to the at least portions of the prescribed area or venue; and utilizing the grid scheme and the heat map to identify the one or more spatial regions.

In another aspect of the disclosure, a computerized network device configured to communicate with at least two wireless networks each having one or more access nodes is described. In one embodiment, the one or more access nodes support at least one wireless access technology, the at least two wireless networks serving at least a prescribed service area or venue, and the computerized network device includes: processor apparatus; network interface apparatus in data communication with the processor apparatus and configured to at least receive data from each of the at least two wireless networks; and computerized logic in data communication with the processor apparatus.

In one implementation thereof, the network device is a coordinator node, and the logic is configured to, when executed, cause the computerized network device to: receive at least one first data element from a first one of the two or more wireless networks, the first data element relating to operation of at least one wireless access node within the first one of the networks; process the received at least one first data element to produce information facilitating scheduling of at least one second one of the wireless networks; and cause transmission of the produced information to the at least one second one of the wireless networks.

In another implementation, the at least one wireless access node includes at least one of a 4G LTE (Long Term Evolution) eNB (eNodeB) or 5G NR (New Radio)-compliant gNB (gNode B), configured to operate in one or more RF bands within 3GPP NR FR1 (Frequency Range 1); and the second one of the wireless networks includes at least one access node configured to operate in one or more RF bands which overlap with FR1. For example, the one or more RF bands within 3GPP NR FR1 (Frequency Range 1) comprise a CBRS (Citizens Broadband Radio Service) band within the band of 3.550 to 3.700 GHz inclusive, the at least one wireless access node within the first network functioning as a CAT-A or CAT-B CBSD (Citizens Broadband Radio Service Device).

As another implementation, at least one wireless access node within the first one of the network is configured for wireless data communication with a plurality of CBRS fixed wireless apparatus (FWA) disposed within the prescribed service area or venue.

In another variant, the produced information facilitating scheduling of at least one second one of the wireless networks includes information specifying scheduling according to a time slotted protocol to be utilized by at least the second wireless network, the time slotted protocol utilizing a different time reference than a time reference used by a TDD (time division duplex) protocol associated with the second wireless network. For example, in one implementation thereof, the computerized logic of the network device is further configured to use at least one hint data as part of production of the information specifying scheduling, the at least one hint data relating to scheduling information of the TDD protocol. The at least one hint data includes for instance data relating to an IEEE Std. 802.11ax TWT (target wait time).

In a further aspect, a computerized wireless access node configured for use within a wireless network is disclosed. In one embodiment, the node is configured for wireless communication with a plurality of computerized user devices and at least a computerized network node, and includes: processor apparatus; wireless interface apparatus in data communication with the processor apparatus and configured to transmit and receive wireless signals in one or more radio frequency (RF) bands; and computerized logic in data communication with the processor apparatus and configured to, when executed, cause the computerized wireless access node to: receive at least one data element from the computerized network node; process the received at least one data element to produce information facilitating scheduling of at least transmissions by the wireless interface apparatus, the scheduling being in addition to scheduling generated by a wireless interface protocol used by the wireless interface apparatus; and utilize the information in order to control at least one transmission of wireless signals from the wireless interface apparatus.

In one variant, the scheduling generated by a wireless interface protocol used by the wireless interface apparatus includes TDD (time division duplex) scheduling generated by a scheduler process of a wireless chipset of the computerized wireless access node.

In another variant, the received at least one data element includes data generated based on a schedule of transmissions from at least one access node within another wireless access node operational within a wireless network using a different radio area technology (RAT) than a RAT used by the wireless interface apparatus.

In another aspect of the disclosure, a system architecture is disclosed. In one embodiment, the system architecture includes at least two heterogeneous RATs, and a slot coordinator configured to impose a temporo-spatial access scheme on at least one of the RATs in order to enhance spectral use efficiency within a prescribed area or venue being managed.

In another aspect of disclosure, a computer readable apparatus is disclosed. In one embodiment, the apparatus includes a storage medium configured to store one or more computer program. In embodiment, the apparatus includes a program memory, flash memory, or HDD or SSD on a computerized controller device, such as MSO or MNO network controller. In another embodiment, the apparatus includes a program memory, flash memory, or HDD or SDD on a computerized access node (e.g. xNBe) or a network coordinator or controller device.

In yet another aspect, methods and apparatus for enhancing utilization efficiency of wireless spectrum are disclosed. In one embodiment, the wireless spectrum includes unlicensed spectrum, and the increased efficiency is provided by at least better coordinating transmission opportunities for multiple RATs using the unlicensed spectrum.

In yet another aspect, methods and apparatus for reducing at least one of network CAPEX or OPEX are disclosed. In one embodiment, the methods and apparatus allow for reduced node (e.g., xNB or WLAN AP) density within a given area based on the aforementioned enhanced efficiency.

In yet another aspect, methods and apparatus for generating time-based scheduling for two different RATs operating within a common area or venue and using common spectrum are disclosed.

In a further aspect, an integrated circuit (IC) apparatus is disclosed. In one embodiment, the IC apparatus includes one or more individual ICs or chips that are configured to contain or implement computerized logic configured to enable LTE or 5G NR co-existence and cooperative use with non-3GPP technologies such as Wi-Fi.

These and other aspects shall become apparent when considered in light of the disclosure provided herein.

BRIEF DESCRIPTION OF THE DRAWINGS

FIG. 9 is a logical flow diagram illustrating one embodiment of a generalized methodology of coordinating operation multiple (e.g., two) RATs within a prescribed area or venue, according to the present disclosure.

FIGS. 3-12 © Copyright 2020 Charter Communications Operating, LLC. All rights reserved.

DETAILED DESCRIPTION

Figure 1:
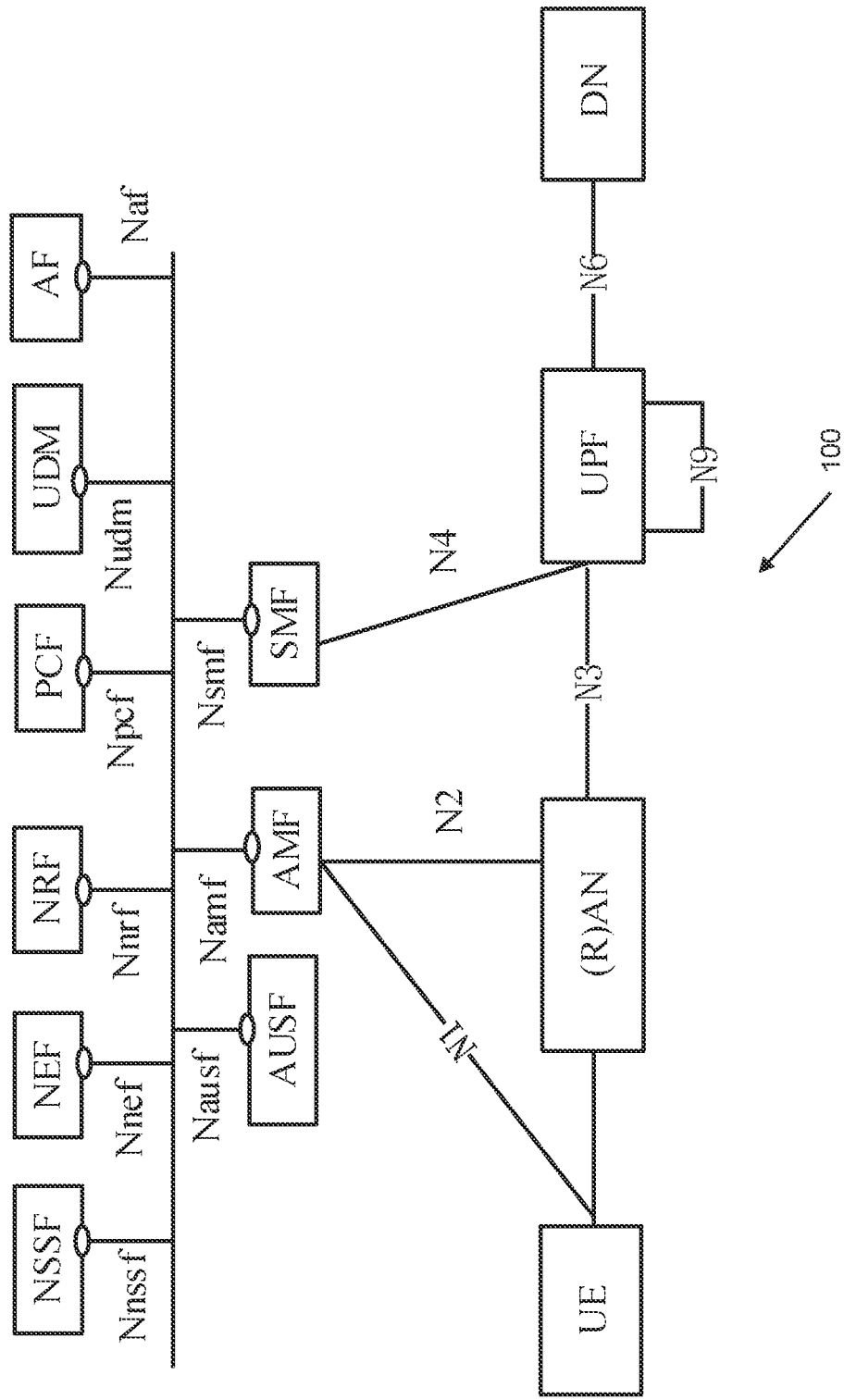
FIG. 1 is a block diagram illustrating a 3GPP 5G NR network architecture.
Figure 2:
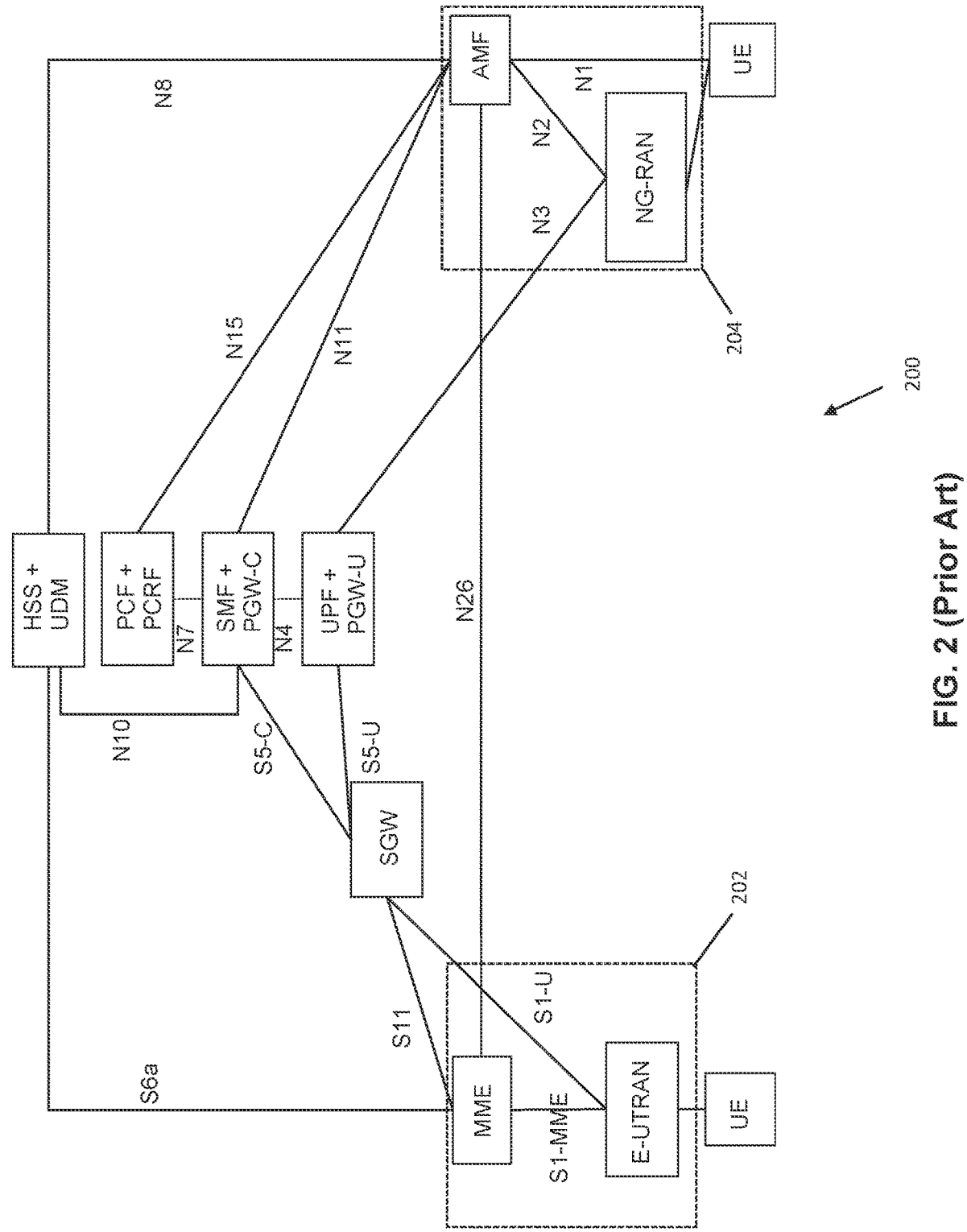
FIG. 2 is a block diagram illustrating a 3GPP 4G and 5G NR network architecture.

Reference is now made to the drawings wherein like numerals refer to like parts throughout.

As used herein, the term "access node" refers generally and without limitation to a network node which enables communication between a user or client device and another entity within a network, such as for example a CBRS CBSD, small cell, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. Applications as used herein may also include so-called "containerized" applications and their execution and management environments such as VMs (virtual machines) and Docker and Kubernetes.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1. 3, Jan. 2018, incorporated herein by reference in its entirety, and any related documents or subsequent versions thereof.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, FWA devices, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0, 3.1 and 4.0 and any EuroDOCSIS counterparts or derivatives relating thereto, as well as so-called "Extended Spectrum DOCSIS".

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, and spin Ram, PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with any of 3GPP Release 15-17, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS. As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS, and other bands such as e.g., Bands 12-17 and 71.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/ay/ba/be or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "wireline" includes electrical and optical transmission media such as, without limitation, coaxial cable, CAT-5/6 cable, and optical fiber.

As used herein, the term "xNB" refers to any 3GPP-compliant node including without limitation eNBs (eU-TRAN) and gNBs (5G NR).

Overview

In one exemplary aspect, the present disclosure provides apparatus and methods which enable coordination between two "different" RATs (whether different technology standards, or the same or similar standards which would otherwise operate in an uncoordinated fashion) operating in the same geographical area or vicinity.

At a high level of abstraction, the disclosed apparatus and methods provide coordination of temporal and spatial resources within a contention environment so as to both maximize spectral efficiency and provide some level of resource allocation "fairness" across different users and (potentially) different technologies. In one embodiment, a slot coordinator entity is used as a common controller to synchronize operation of the various RATs within a common geographic or spatial domain, such as within a target venue such as a concert hall or sports stadium. The underlying RATs operate effectively as normal (i.e., uncoordinated, and based on their underlying 3GPP or WLAN or other protocols), yet with the distinction that each is "gated" for operation in either UL or DL within certain time and spatial coordinates as determined by the coordinator logic so as to avoid contention for the common frequency resources.

In some variants, computer-generated heat maps generated for the target venue can be used by the coordinator to model a spatial "grid" or overlay within which the temporal mapping or slotting is imposed. In this fashion, a temporal or slot map can be maintained on a per-grid basis if desired. In grid portions of no contention, coordination can be selectively obviated.

In other variant, cloud-based machine learning (ML) is used to support coordinator operations substantially in real time. Data from e.g., prior events, as well as concurrently generated data, are utilized by the cloud ML processes to determine use patterns such as changes in user spatial density and load (density), and output of the ML processes is used by the coordinator in real-time allocations of resources so as to maximize spectral use efficiency.

In some use cases described herein, the technologies (RATs) being coordinated are heterogeneous in nature (e.g., Wi-Fi and 3GPP-based), and the users of the respective technologies are associated with a common network operator or service provider (e.g., cable MSO or cellular MNO). In other use cases, the technologies are homogeneous (e.g., both 3GPP based or both WLAN), yet are uncoordinated, and may be operated by different operators such as different MNOs, or an MSO and MNO, which may also have service level or other "sharing" arrangements for a given venue, which may be predetermined or even dynamically negotiated based on respective subscriber use.

Advantageously, the exemplary characterization and scheduling methods and apparatus described herein can be independent of the underlying RAT technologies, thereby avoiding e.g., CAPEX with installing new NodeB or WLAN AP configurations, or any changes to UE or STA functionality.

Detailed Description of Exemplary Embodiments

Exemplary embodiments of the apparatus and methods of the present disclosure are now described in detail. While these exemplary embodiments (and the discussion of identified issues present in the prior art) are described in the context of the previously mentioned user devices (e.g., multi-RAT capable UEs/STAs) and wireless access nodes (e.g., 3GPP xNBs and Wi-Fi APs) associated with or supported at least in part by a managed network of a service provider (e.g., MSO and/or MNO networks), other types of radio access technologies ("RATs"), and other types of networks and architectures that are configured to deliver digital data (e.g., text, images, games, software applications, video and/or audio/voice) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., outdoors, commercial/retail, or enterprise domain (e.g., businesses), or even governmental uses. Yet other applications are possible.

Also, while certain aspects such as certain types of PDU sessions are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the various aspects of the present disclosure contemplate use of unlicensed (e.g., LTE-U or NR-U), or quasi-licensed spectrum (such as CBRS General Access (GAA) spectrum in the 3.5 GHz band (specifically 3,550 to 3,700 MHz), it will be appreciated by those of ordinary skill when provided the present disclosure that the methods and apparatus described herein may be configured to utilize other "quasi-licensed" or shared access systems or other spectrum, including without limitation DSA, LSA, or TVWS systems, and those above 4.0 GHz (e.g., currently proposed allocations up to 4.2 GHz, and even millimeter wave bands such as those between 24 and 100 GHz).

Further, while some aspects of the present disclosure are described in detail with respect to so-called 5G "New Radio" (3GPP Release 15-16 and TS 38.XXX Series Standards and beyond), such aspects are in some cases access technology "agnostic" and hence may be used across different access technologies, and can be applied to, inter alia, any type of P2MP (point-to-multipoint) or MP2P (multi-point-to-point) technology, including e.g., Qualcomm Multefire.

It will also be recognized that while the exemplary embodiments described herein are primarily described in terms of coordination of two RATs (e.g., WLAN and 3GPP), the methods and apparatus disclosed herein may be readily adapted by those of ordinary skill in the wireless arts for use with more than two RATs (e.g., 3GPP, WLAN, and IoT such as 802.15.4, or two different variants of 3GPP such as LTE-U and NR-U, and WLAN).

Other features and advantages of the present disclosure will immediately be recognized by persons of ordinary skill in the art with reference to the attached drawings and detailed description of exemplary embodiments as given below.

System Architecture and General Functionality—

Figure 3:
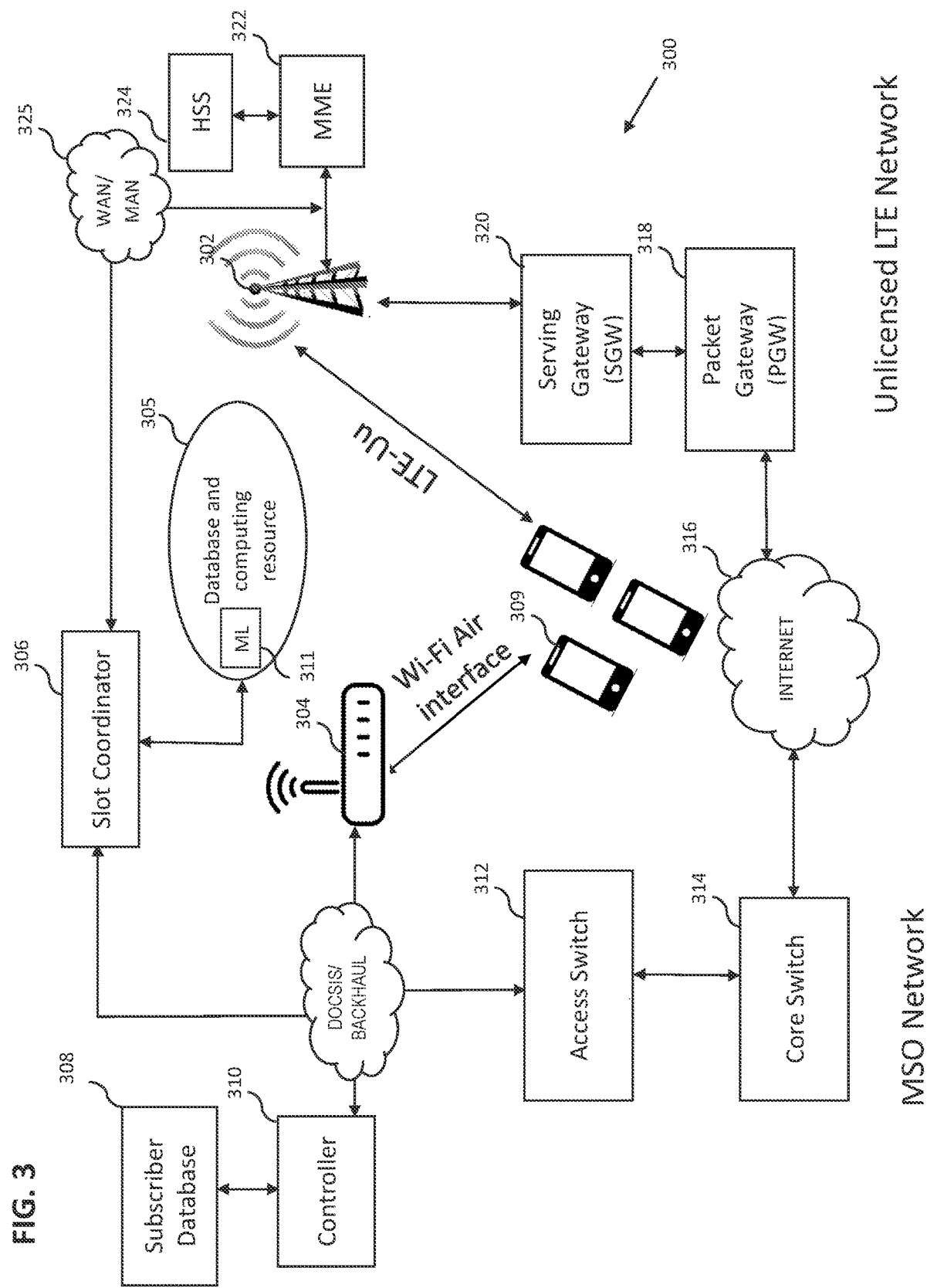
FIG. 3 is a block diagram illustrating one embodiment of a wireless coordination system according to the present disclosure, wherein wireless RATs from two different network operators are coordinated.

FIG. 3 is a block diagram illustrating one embodiment of a wireless coordination system according to the present disclosure, wherein wireless RATs from two different network operators are coordinated. As shown, the architecture 300 includes a first network operator portion (e.g., MSO) and a second network operator portion (e.g., MNO), with respective RATs such as Wi-Fi 304 and LTE-U 302. The two RATs are logically connected to a slot coordinator function 306, such as which be maintained by one of the two operators, or a third party or proxy. The slot coordinator is also communicative with a cloud database and computing resource 305, including one or more machine learning (ML) processes 311.

The first RAT includes in this scenario an enhanced AP (APe) controller 310 and communicative subscriber database 308, and access and core switching functions 312, 314 which provide backbone access to the Internet or other MAN/WAN 316, the latter which also is communicative with the second RAT and its core network (here, a 3GPP-based network architecture including PGW 318, SGW 320, Mobility Management Entity (MME) 322, and Home Subscriber Server (HSS) 324).

As shown, a plurality of user devices 309 may include air interface support for both RATs (e.g., have 802.11 and LTE or NR support).

As described in greater detail below, the coordinator process 306, depending on configuration, operates to determine a number of parameters and functions relating to utilization of the two RATs within a common or managed area or venue, as well as determining scheduling for one or both RATs. In the exemplary embodiment, the coordinator acts effectively as a TDD slot coordination function, imposing a higher-level, common time reference on the different RATs which is independent of the RAT indigenous time domains, including when and in what direction (DL or UL) transmissions will be performed. This advantageously allows the underlying RATs and their extant protocols to be used without modification; rather, the RATs are intelligently temporally "gated" relative to one another based on spatial and other considerations so as to minimize potential interference (and contention, which may trigger undesirable LBT or other medium access assessment behavior) and enhance time-frequency resource utilization efficiency.

The AI/ML process 311 and cloud entities 305 in one embodiment provide analysis of short term (or e.g., more gradual/long term) patterns of usage within the managed area or venue (as well as others), including analysis based on spatial, temporal, and/or RAT-specific parameter. For example, patterns regarding UE versus STA technology presence and preference within a venue or specific spatial zones thereof (e.g., how many 4G versus 5G UEs access the xNBe devices, 802.11ax versus 802.11ac or n devices, etc.), invocation of certain modes of operation such as carrier aggregation (CA), dynamic TDD, TWT, etc.), DL vs. UL bandwidth consumption (including on a per-RAT type basis), and other useful data may be transmitted to the cloud analytics and analyzed in real time or with latency, and data relating thereto fed back to the coordinator 306 such that its algorithms can better schedule RAT allocations for enhanced efficiency. As a simple example, a given venue may get predominantly cellular users clustered in some areas, whereas WLAN users tend to be more homogenous, when evaluated across multiple different events. As such, the coordinator can allocate temporal resources (e.g., slots) to the different RATs covering those areas differently so as to weight them more in accordance with expected demand.

The coordinator 306 is in one embodiment configured as a real-time entity that obtains data from both technologies in order to provide scheduling of temporal/spatial resources. Generally, in the case of co-existence of technologies, it can be assumed that one technology will be used more heavily than the other for at least a period of time, until there is a gradual shift to the other technology as that technology becomes more widely adopted. In such cases, one technology may be deemed "primary" due to heavier load being carried by that technology, as well as much broader deployment in the past. As one example of the foregoing, incumbent Wi-Fi deployments are much more pervasive that recent NR-U or LTE-U deployments, the latter only now gaining more traction as of the date of this writing.

As an example, consider a venue having deployment of Wi-Fi and LTE-U or NR-U as in FIG. 3. The venue is divided into various spatial sections which are defined based on the reach of access nodes (e.g., xNBs or APs) and may very well be dynamic (see discussion of FIGS. 4-7 below). In a given section, assume for purposes of illustration that there is a heavy concentration of people within that spatial section, and the section is designed in a way that RF coverage from the access nodes within that section is largely coextensive with its boundaries. Each such section is given an identifier value (ID). Any WLAN APs or xNBs within this section (and their corresponding IDs) are associated with this section within the coordinator logic. When this logic is replicated across all such sections of the venue, an organizing database can be formed which tracks all Wi-Fi and NodeB units.

The time coordinator in one embodiment produces this information per zone/section, and is aware of what xNBs and Wi-Fi APs are installed within the zone, along with their particular locations and configurations. For instance, in one variant, each xNB and AP is assigned a unique ID (which may be based on MAC address or other unique data of the device, such as an IP address, cellular PCI, or other), and its installed location within the venue determined such as based on installer data. This location information may be specified in three dimensions if desired (e.g., precise LAT/LON and elevation), so that sections maybe generated in three dimensions. This approach may be useful e.g., where certain venues have several different elevations as part of their architecture, such as in bowl-shaped sport stadiums or "theater in the round" type venues, and as such normal coverage areas for a given EIRP of the node may be altered by such architecture.

With respect to a given section or zone, the slot coordinator may also obtain data (such as from an AP controller or MME) for information for a specific AP/xNB such as node loading in DL and UL, use of spatial diversity and/or spatial multiplexing, location of subscriber devices (using e.g., beamforming or triangulation/TOF type calculations) in real time. Actual use of allocated time slots may also be tracked; i.e., what fraction of the slots allocated to a given node or section are actually being utilized, so as to determine whether further spectral efficiency gains are possible through reallocation of some slots to another node.

In this manner, the coordinator can maintain a spatial and temporal map of time slots during which a given channel is occupied, and in what direction (UL or DL) each slot is likely to be utilized.

The present disclosure also contemplates that differentiation between DL and UL can be utilized as a basis for differential treatment of time slots. For instance, it is known that a UE or STA will typically transmit on an UL at much lower power than the corresponding access node will transmit on a DL. Hence, the effect of such UL signals on interference of neighboring cells or sections of the grid will be ostensibly reduced during UL windows or slots as compared to the DL slots.

Example Venue and Grid Mapping—

Figure 4:
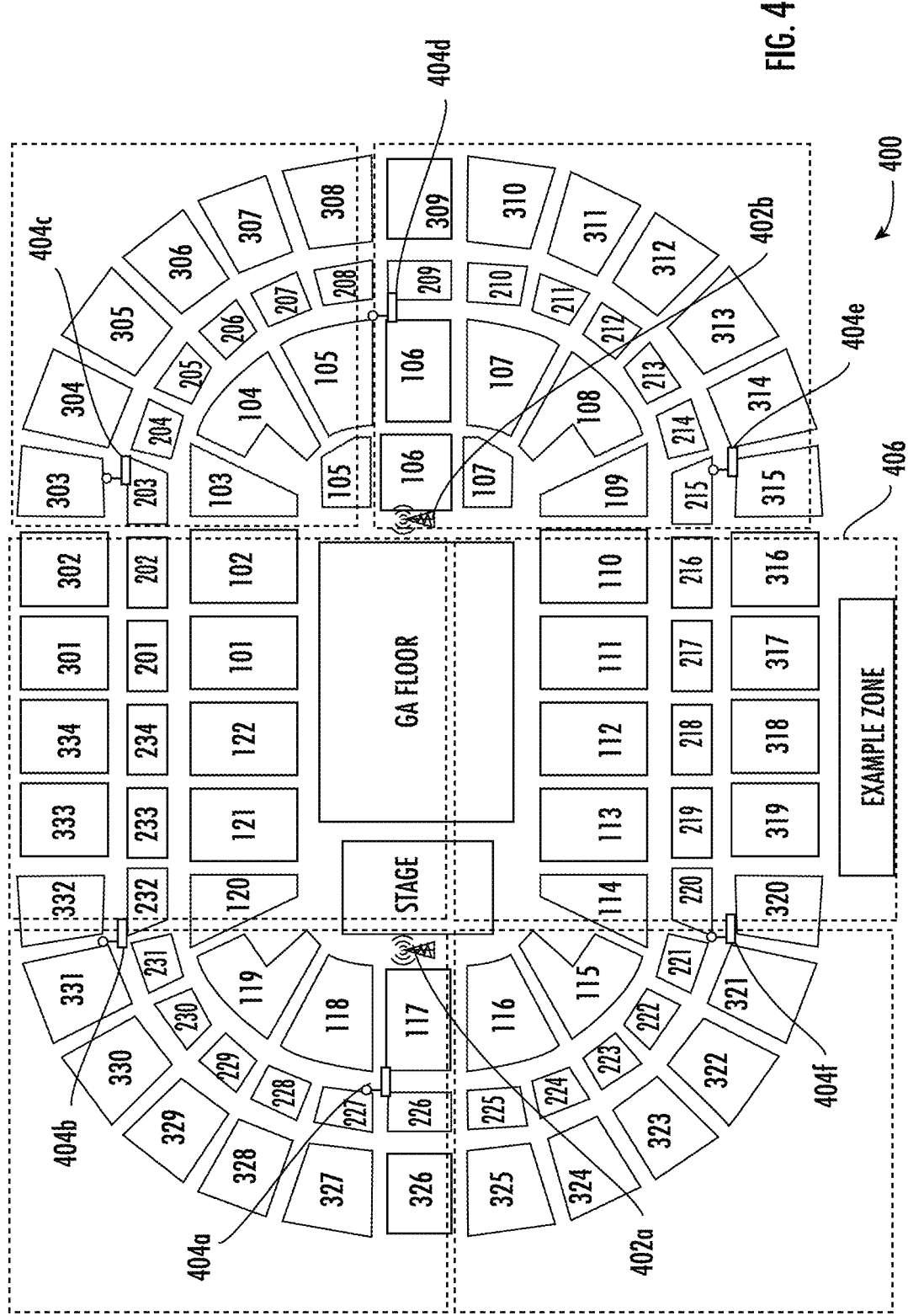
FIG. 4 is a graphical plan view of an exemplary venue within which multi-RAT access may be managed according to the methods and apparatus of the present disclosure.

FIG. 4 is a graphical plan view of an exemplary venue within which multi-RAT access may be managed according to the methods and apparatus of the present disclosure. As shown, the venue 400 includes a plurality of virtual or abstract zones (such as example zone 406) which may or may not coincide with any structural or other features of the venue, and a number of different RATs (here two) having respective access nodes 404a-f and 402a-b (e.g., enhanced WLAN APs (APes) and enhanced 3GPP compliant Node B devices (xNBes). Disposition of the APe and xNBe devices will generally be determined by the structural and/or topological features of the managed venue or area; i.e., in order to provide adequate signal coverage in areas where users might be found, to the maximum degree practicable, such as determined by test measurement equipment, computer-modeled heat maps, etc.

Figure 5A:
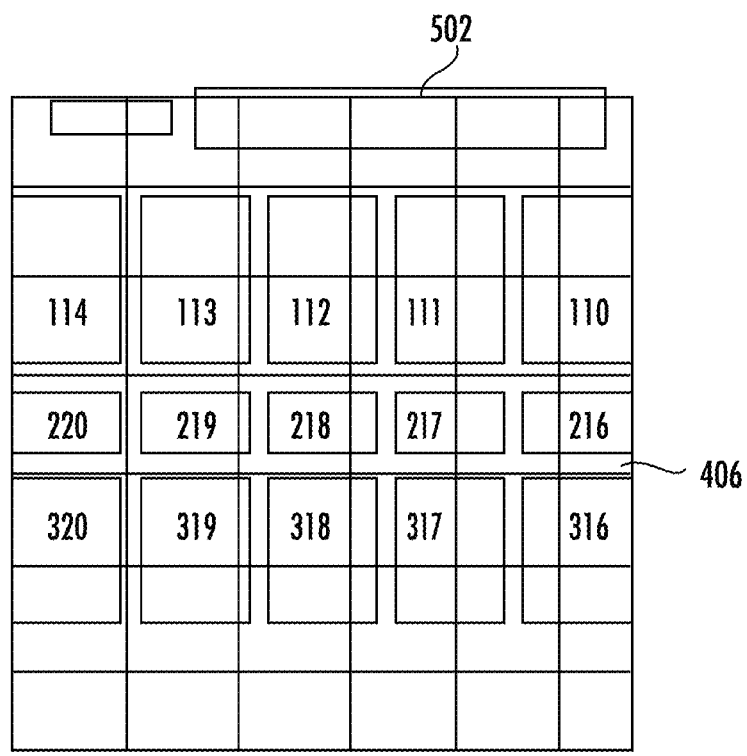
FIG. 5A is a graphical plan view of a selected portion of the venue of FIG. 4, showing an exemplary (virtual) grid map applied thereto.

FIG. 5A is a graphical plan view of a selected portion of the venue of FIG. 4, showing an exemplary (virtual) grid map applied thereto. In this figure, the exemplary zone 406 of the venue is further logically subdivided into a grid 502 of sections or cells by the coordinator 306, as described in greater detail below. The placement, scale, and type of grid may be determined based on any number of considerations including the structure/shape of the venue or area, planned or actual user density, etc. Each section or cell in the grid may be assigned a Section/Cell ID value, which may be arbitrary or even correlate with zones of physical portions of the venue (e.g., "Seating Section 319" or the like). In one variant, the coordinator keeps a row/column matrix for the managed venue or area, and assigns each section or cell a sequential ID value based on row/column position in the matrix.

Figure 5B:
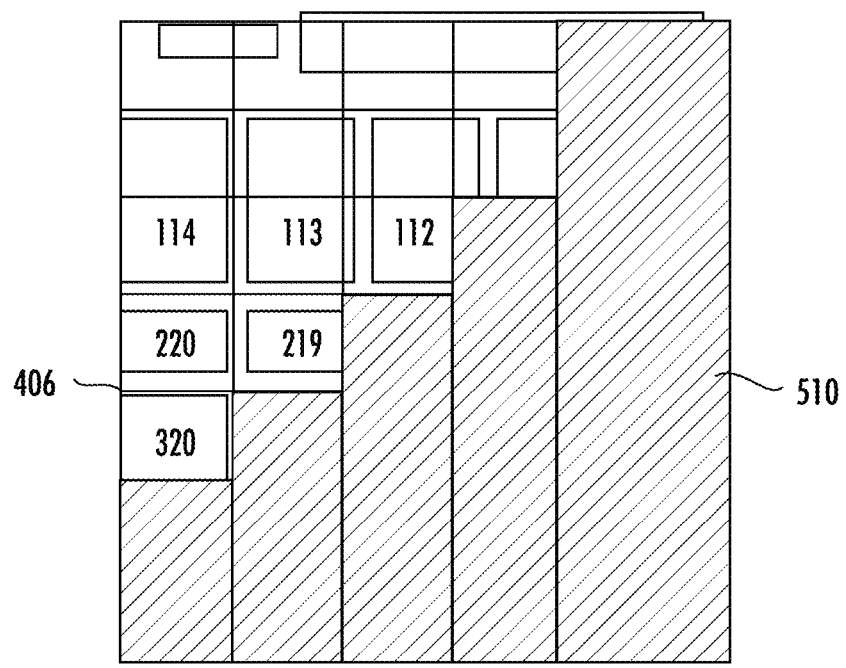
FIG. 5B is a graphical plan view of the selected portion of FIG. 5A, illustrating portions or sections of the grid enabled for operation of one RAT based on analyses performed by the disclosed RAT coordinator process.

FIG. 5B is a graphical plan view of the selected portion of FIG. 5A, illustrating portions or sections of the grid enabled for operation of one RAT based on analyses performed by the disclosed RAT coordinator process. As described in greater detail below, in one embodiment the coordinator 306 is configured to determine "green" zones or sections 510 within the applied grid of a larger zone 406, wherein certain criteria are met relative to one or multiple RATs. For instance, in one variant, the determination of a green zone condition is based on estimated lack of significant interference or contention of a common frequency resource (e.g., band or sub-band) within the designated section or group of sections of the grid. As such, determination of such green zones or regions of the grid can be used for scheduling of operation of one (or multiple) RATs operating within the managed area or venue.

Figure 6:
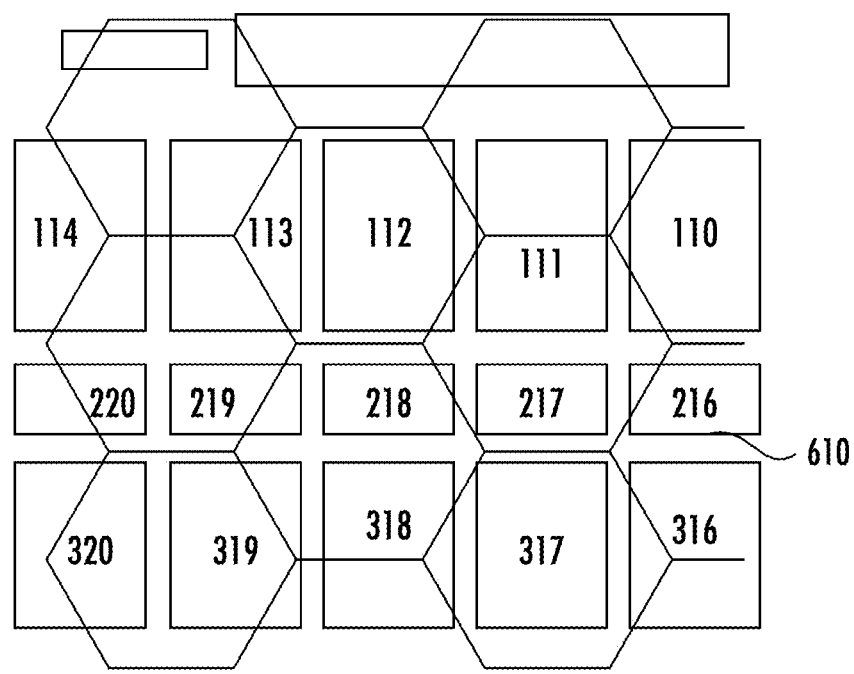
FIG. 6 is a graphical plan view of a selected portion of the venue of FIG. 4, showing another exemplary embodiment of a (virtual) grid map applied thereto (i.e., with hexagonal cells).

FIG. 6 is a graphical plan view of a selected portion of the venue of FIG. 4, showing another exemplary embodiment of a (virtual) grid map applied thereto (i.e., with hexagonal cells 610).

Figure 7:
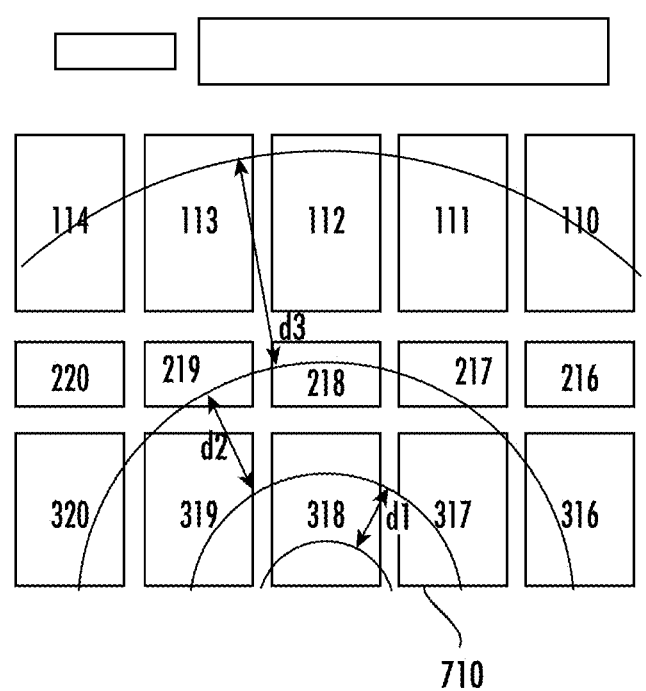
FIG. 7 is a graphical plan view of a selected portion of the venue of FIG. 4, showing yet another exemplary embodiment of a (virtual) grid map applied thereto (i.e., with non-linear changes in radius).

FIG. 7 is a graphical plan view of a selected portion of the venue of FIG. 4, showing yet another exemplary embodiment of a (virtual) grid map applied thereto (i.e., with non-linear changes in radius). In this example, a polar coordinate grid mapping is used, with non-linear spacing (d1, d2, d3) between borders of sections or cells 710.

Figure 8:
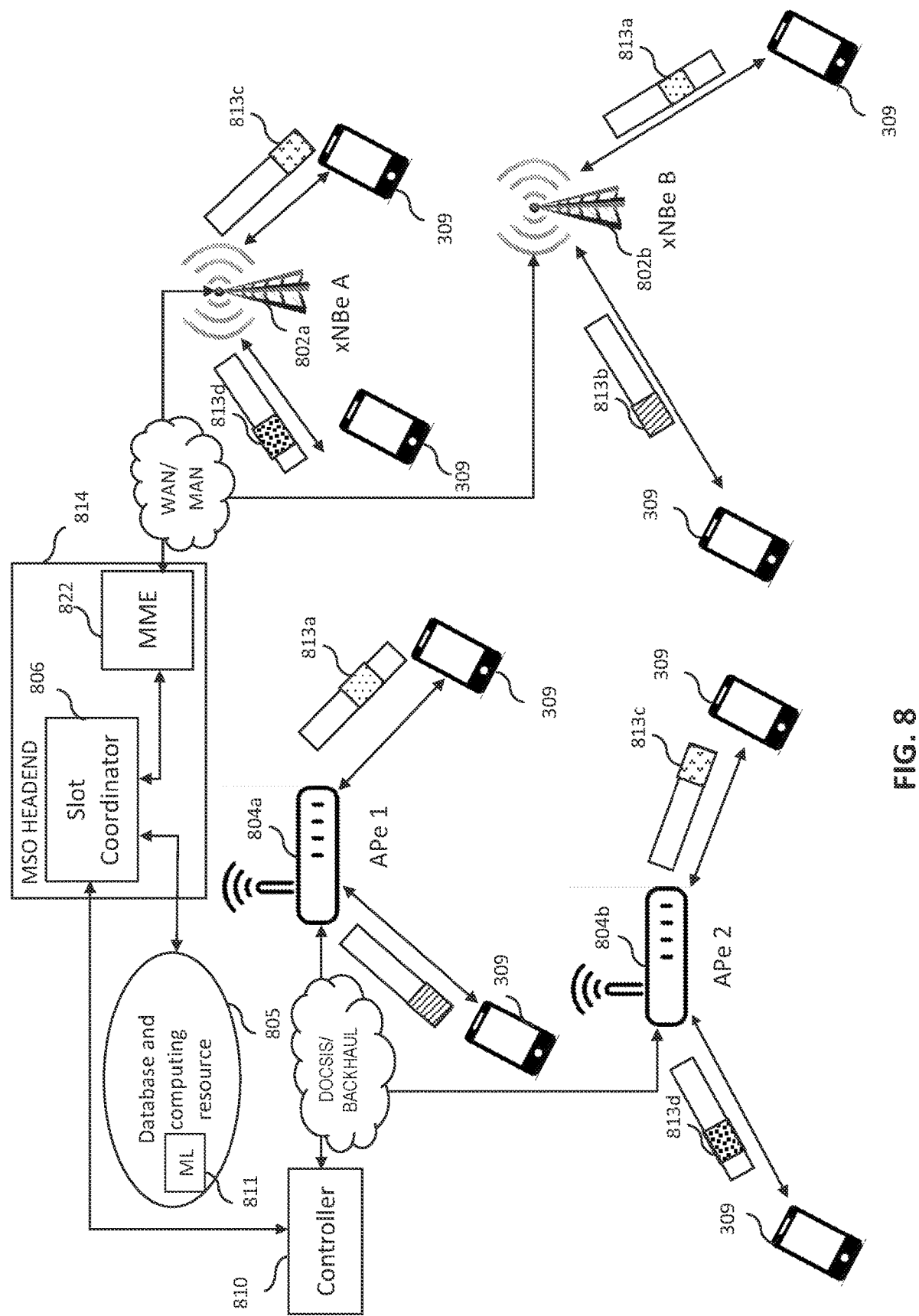
FIG. 8 is a block diagram illustrating another embodiment of a wireless coordination system according to the present disclosure, wherein wireless RATs from a common network operator (e.g., cable MSO) are coordinated.

FIG. 8 is a block diagram illustrating another embodiment of a wireless coordination system according to the present disclosure, wherein wireless RATs from a common network operator (e.g., cable MSO) are coordinated. In this architecture, a common operator core or headend 814 includes the slot coordinator 806, as well as the MME 822 for the operator's unlicensed cellular (RAT 2) users. For instance, the xNBe devices 802 may comprise "small cells" deployed by the MSO for servicing its subscribers, or even CBRS CBSD devices. The WLAN controller 810 for RAT 1 APe devices may also be disposed at the headend, or more locally to the managed venue or area as shown. In this example a DOCSIS-based backhaul is used for the WLAN APe devices 804, while a fiber WAN/MAN and associated backhaul is used for the 3GPP cellular RAT, although it will be appreciated that any backhaul of suitable bandwidth and capability may be used for either RAT.

As further shown in the example of FIG. 8, the individual access nodes of each RAT may be coordinated with access nodes of the other RAT in transmitting DL data. For example, APEe 2 804b and xNBe A 802a may be spatially located such that low levels of interference/contention exist, and as such may concurrently utilize a common time slot 813d for DL transmission to respective STA or UE devices 309, even though operating in the same frequency band(s). Similar logic applies to slots 813a-c, respectively.

Exemplary Methodologies

Figure 9A:
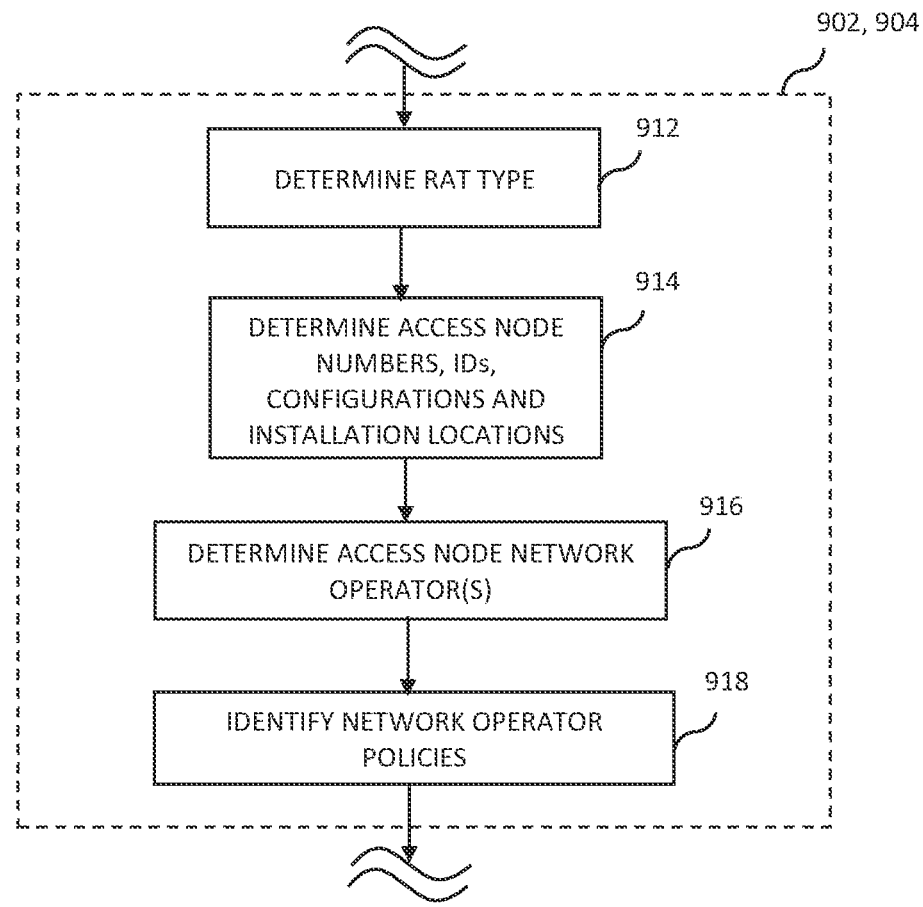
FIG. 9A is a logical flow diagram illustrating one implementation of the generalized methodology of FIG. 9, specifically relating to RAT characterization.

Referring now to FIG. 9, one embodiment of a generalized method of coordinating operation multiple (e.g., two) RATs within a prescribed area or venue, according to the present disclosure is shown and described. As shown in FIG. 9, the method 900 includes first characterizing a first RAT to be used within the venue or area being managed (step 902). Similarly, in step 904, a second RAT to be managed within the area/venue is characterized. Exemplary implementations of these RAT characterizations are described in greater detail below with respect to FIG. 9A.

It will be appreciated that while described in terms of two RATs, the method 900 may be adapted to management of three or more RATs (such as e.g., two 3GPP-based RATs and a WLAN, a 3GPP-based RAT, a WLAN, and an IoT RAT, etc.)

Next, per step 906, the area/venue to be managed is characterized. This allows for, inter alia, determination of particular geographic, architectural, or other features and geometries which may affect aspects such as path loss and RF signal propagation, placement of access nodes, etc. Exemplary implementations of venue/area characterizations are described in greater detail below with respect to FIG. 9B.

Per step 908, a utilization schedule for the managed venue or area is developed (see discussion of FIG. 9C below for exemplary implementations thereof). In one variant, since the frequency band(s) being utilized by the various technologies are known a priori, and the underlying different RAT technologies incorporate mechanisms for utilization of carriers or sub-bands within a given frequency band, the coordinator process 306 does not attempt to manage any frequency resources (rather relying on the underlying RATs to do so, albeit independent of one another). However, the temporal aspect of utilization of the potentially overlapping spectrum, and the spatial aspect of utilization, are managed by the coordinator, including development of a time-slot based schedule for individual sections of the aforementioned grid(s).

Lastly, per step 910, the developed schedule from step 908 is implemented within the managed area or venue, such as via the coordinator 306 transmitting schedule data to each of the AP controller 310 and cognizant 3GPP process (e.g., MME), with such schedule data being passed down to scheduler logic of the APe and xNBe devices (discussed below with respect to FIGS. 11 and 12) in order to enforce the schedule developed by the coordinator 306 as applicable.

Notable, as indicated in FIG. 9, the process 900 may iterate either continuously, or based on a schedule or driven by one or more events. For example, one variant causes the coordinator scheduler logic to check for any updates to all or a subset of parameters relating to RAT characterization (e.g., was MCS or spatial diversity/multiplexing changed for a given access node, has demand/throughput in UL or DL changed, has any access node been moved spatially, has the distribution or cross-section of RAT 1/RAT 2 users in the venue or area changed, etc. at a prescribed periodicity.

In another variant, the logic checks for updates based on changes in the output schedule or results of the schedule development (e.g., when RAT contention is noted to increase in one or more grid sections or regions, resources are becoming more sparse, and hence accurate and updated scheduling to ensure "fairness" for all managed RATs is more critical). Hence, the more "packed" the schedule becomes, the greater the frequency of update. Note that these updates may also be conducted on either on a global scale (i.e., all sections of the grid and all access nodes managed), or in logical "slices", such as on a per-grid section (or group/aggregation of grid section) basis, on a per-access node base, on a per-RAT basis, etc. as desired. For instance, if the LTE RAT has very stable user subscription and location, while a WLAN RAT in the same venue has more transient user population and load, then the latter may be ascribed a different update frequency or conditions than the former.

FIG. 9A is a logical flow diagram illustrating one implementation of the generalized methodology of FIG. 9, specifically relating to RAT characterization. As shown, the RAT characterization processes 902, 904 are in this implementation comprised of a determination of RAT type (step 912), including the general classification of the RAT (e.g., from pre-determined classifications such as 3GPP LTE, 3GPP NR, 3GPP IoT (NB-IoT, eMTA, etc.), WLAN (802.11x), PAN (802.15.4), or other).

Per step 914, further information is gathered, including for instance (i) a determination of the number of different access nodes of that type installed; (ii) IDs or other identifiers for each access node (e.g., system-assigned identifier, MAC address, IP address, and/or other identifying information); (iii) configurations of each access node, such as e.g., MIMO capability, spatial multiplexing capability, MCS values, standards compliance (e.g., Release 15 3GPP, 802.11ax, etc.) and associated functions such as DSS capability, dynamic TDD capability, TWT/trigger frame capability, etc.; and (iv) installation location data for each access node, such as lat/lon, elevation, and any directionality information (such as where directional or non-omni antenna arrays are used). Other useful configuration information may relate to maximum allowed transmit power (e.g., EIRP or other), such as for different classes of device such as Class A vs. Class B CBRS CBSD devices where applicable.

Per step 916, the network operator owning or managing each given access node (or groups thereof) is determined, such as via the aforementioned configuration information, or from a database correlating the node with a service provider or operator. This data is useful for, inter alia, determining which individual nodes or groups of nodes are subject to network-specific and/or user-specific policies (step 918) regarding wireless access in the venue or area. For instance, where the RAT 1 and RAT 2 access nodes are each owned/managed by a common network operator (see discussion of FIG. 8 below), certain subscriber QoS, access or other service policies can be applied (e.g., one which might indicate that Wi-Fi access is always relegated in importance or priority to LTE/NR access for a certain subscriber tier, even across different users, such that LTE/NR users are favored in terms of slot allocations, or vice-versa). In another example (e.g., in the multi-operator context of FIG. 3), two different network operators providing services to a venue or area, such as WLAN coverage by a cable MSO, and "cellular" unlicensed coverage by an MNO, may have a pre-existing sharing or allocation SLA or other agreement in place which governs how resources are allocated within the venue or area in cases of contention. Myriad other examples of such policies that may be implemented on an operator-specific basis will be appreciated by those of ordinary skill given the present disclosure.

In one variant, the coordinator 306 is provided access to a database of operator-specific policies, and applies them during schedule generation as described in greater detail below. These policies may also be temporally and/or spatially applied; e.g., they only apply during certain periods or windows of time, only apply within certain portions of the managed area or venue, or similar.

Figure 9B:
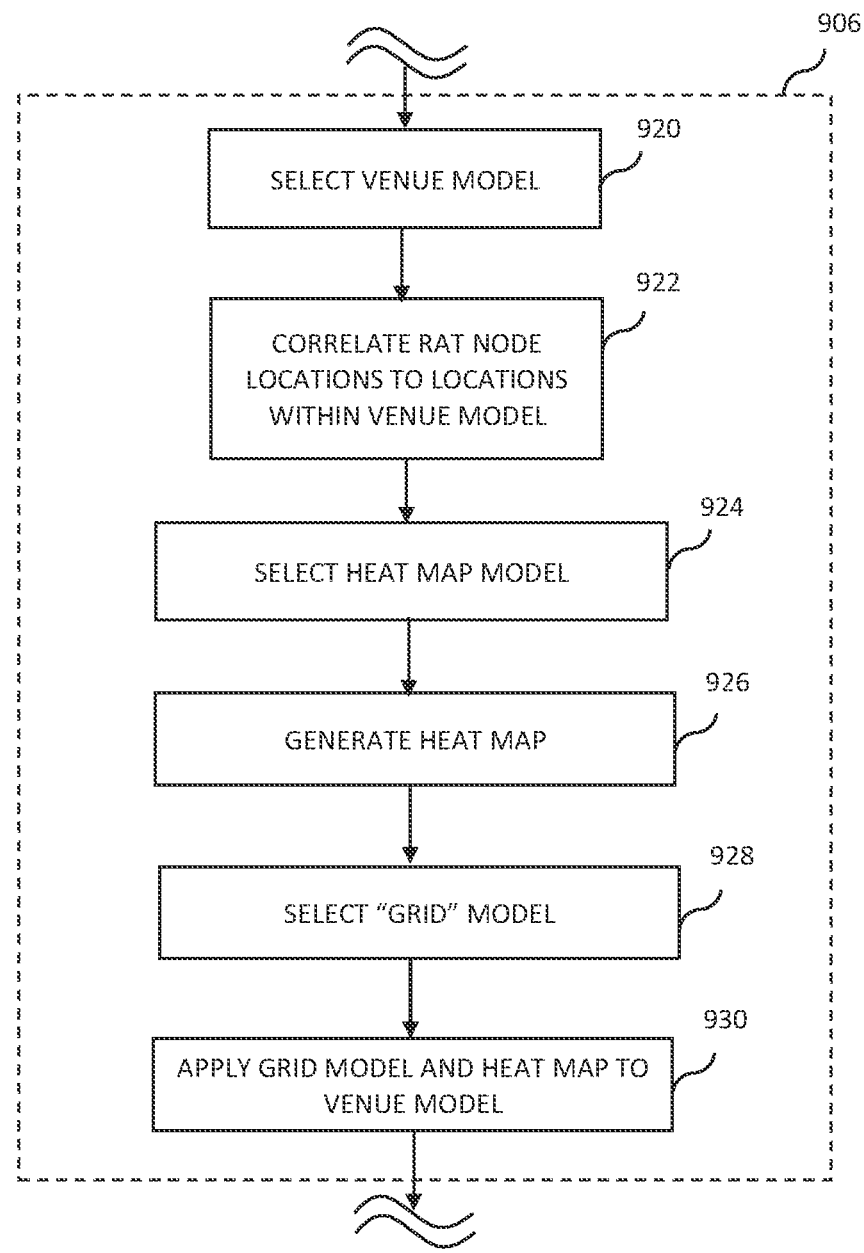
FIG. 9B is a logical flow diagram illustrating one implementation of the generalized methodology of FIG. 9, specifically relating to venue characterization.

FIG. 9B is a logical flow diagram illustrating one implementation of the generalized methodology of FIG. 9, specifically relating to venue characterization. As shown, the exemplary implementation of the method of step 906 of FIG. 9 includes selection of a venue model (step 920), such as from a plurality of possible predetermined configurations. Such configurations may include e.g., flat outdoor area, open indoor area with flat floor, bowl-shaped area or stadium, etc. As discussed in greater detail below, this model helps determine the path loss and other RF propagation characteristics for the various RAT signals within the area venue. The presence of exterior walls, open roof or dome-type roof, stadium (sloped) type seating, playing field or stage central to the venue or at one end, materials of construction, and so forth can affect RF propagation and hence generation of the ultimate "heat map" for each type of RAT (discussed below). These factors are in one implementation loaded into an algorithm executed on the coordinator 306 (or accessed via a cloud service such as via API) to populate data for heat map generation for particular frequency and energy (Tx power) values for each node of each RAT.

Next, per step 922, the RAT access node locations determined previously (steps 902 and 904) are correlated to locations within the venue or area model. In one approach, the lat/lon/elevation data for each node is correlated to specific positions within the selected venue model algorithmically, and "forced" to fit the model so as to maintain consistency therewith (i.e., so as to avoid non-physical results such as a WLAN AP being located within a wall or below the level of seating structures). To the degree that too many inconsistencies arise, the model selection or configuration may also be algorithmically adjusted.

Per step 924, a heat map or propagation/path loss model is selected for use by the coordinator process 306. The propagation model may be selected from a predetermined listing of models, such as e.g., indoor, outdoor, obstructed/indirect propagation, etc., or combinations thereof based on access node location. As such, more sophisticated models which may use multiple different sub-model types as relevant for different access nodes (and RF characteristics) based on node location, frequency band selected, presence of other nodes (including modeling of RF interferers). As but one alternative, the coordinator 306 may develop a "heat map" or plot of SINR as a function of radius from each access node (APe or xNBe) under evaluation at prescribed transmission power levels; to the degree that any portions of the plot fall below minimum acceptable SINR values for UE/STA which may be operating in those areas, the transmit power of the putative interferer is reduced or eliminated via slot scheduling, and the effect on SINR for the given area of the coverage of the "interfered with" device is eliminated for that period of time.

In one variant, the heat-map is configured to resolve the spatial/volumetric heat map to the seat level (i.e., correlating RF conditions to individual seats in a floor plan; see FIG. 4 for an exemplary floor plan of a venue with stadium-type seating). The heat map can also be adjusted to resolve to a per-section basis (i.e., per block on the grid) to reduce computational burden if desired.

The exemplary methods and apparatus described in co-owned and co-pending U.S. patent application Ser. No. 15/612,630 filed Jun. 2, 2017 and entitled "APPARATUS AND METHODS FOR PROVIDING WIRELESS SERVICE IN A VENUE," now U.S. Pat. No. 10,645,547, which is incorporated herein by reference in its entirety may also be used consistent with the present disclosure, such as for without limitation correlation of service levels at various locations within the venue or area based on heat mapping.

The coordinator may also determine interference for the participating access nodes 302, 304; this determination may be (i) estimated, such as based on path loss modeling for the known spatial relationships between the various access node devices (including distance between them, presence of structural or topological or other features, extant transmit power levels and frequencies, etc.), such as by way of actual SINR, iPerf (i.e., packet throughput), BER/PER, or other measurements taken at a given APe/xNBe (or supplied by served UE/STA).

As a brief aside, path loss models are used to predict large-scale coverage for wireless communication system design, implementation and deployment. By using path loss models, devices such as the coordinator, access nodes, or even UE/STA can estimate the received power as a function of e.g., distance, and can predict the SINR which should be achievable from e.g., certain sector of an access node transmitting at a certain power level.

The propagation models used generally indicate that average received signal power decreases logarithmically with the distance between transmitter and receiver. A path loss model for an arbitrary transmitter receiver separation can be expressed as a function of distance, and an exponent, n as in Eqn. (1):

$$PL(dB) = PL(d0) + 10n\log\left(\frac{d}{d0}\right) \quad \text{Eqn. (1)}$$

Where:
n is the path loss exponent which indicates the rate at which path loss increases with distance;
d0 is the close-in reference distance; and
d is the transmitter receiver distance.

Equation (1) shows that the power decreases proportional to $(1/d)^n$, as the distance d between transmitter and receiver increases. The exponent n depends on the specific propagation environment. Table 4 shows exemplary values of the exponent n for different environments.

TABLE 4

| Environment | Path Loss Exponent n |
|---|---|
| Free Space | 2 |
| Urban Area | 2.7 to 3.5 |
| Shadowed Urban Area | 3 to 5 |
| In Building Line-of-Sight | 1.6 to 1.8 |
| Obstructed in Building | 4 to 6 |
| Obstructed in Factories | 2 to 3 |

The reference model of Eqn. (1) is defined via field measurement at distance d0 from the transmitter.

Log-Normal Shadowing—

The model in Eqn. (1) does not consider the fact the propagation environment can have different propagation characteristic. Therefore, in some scenarios where the environment surrounding transmitter and receiver are different, the estimated power from Eqn. (1) is vastly different than the measured signal. As the measurement in the field has shown, the path loss PL(d) at distance d from a transmitter is random has a log-normal distribution as defined by Eqns. (2) and (3):

$$PL(d) = PL(d0) + 10\log\left(\frac{d}{d0}\right) + X\sigma \quad \text{Eqn. (2)}$$

where $X\sigma$ is a zero-mean Gaussian random variable with standard deviation a, and $$P_{RX}(d) = P_{TX}(d0) - PL(d) \quad \text{Eqn. (3)}$$

The log-normal distribution describes the shadowing effects which occur in in applications which have the same transmitter receiver distance, but have different propagation environments such as different presence of obstacles (e.g., building, mountains, towers). The close-in reference distance d0, the path loss exponent n, and the standard deviation σ define the path loss model for transmitter receiver separation distance d. The path-loss model of Eqn. (2) can be used to estimate the received power from a given access node 302, 304 at the UE/STA antenna elements.

Table 5 below shows exemplary path loss exponent n values and shadowing standard variation a for different environments based on measurements, reported in "*Wireless and Cellular Communications*", Thomas Schwengler, First Edition, December 2019 which is incorporated here herein by reference in its entirety.

TABLE 5

| Source | Frequency (GHz) | Path Loss Exponent n | σ (dB) | Comments |
|---|---|---|---|---|
| Seidel | 0.9 | 2.8 | 2.8 | Suburban |
| Erceg | 1.9 | 4.0 | 4.0 | Terrain category |
| Feuerstein | 1.9 | 2.6 | 2.6 | Medium Antenna height |
| Abhayawardhana | 3.5 | 2.13 | 2.13 | |
| Durgin | 5.8 | 2.93 | 2.93 | Residential |
| Porter | 3.7 | 3.2 | 3.2 | |
| Rautianinen | 5.3 | 4.0 | 4.0 | |
| Schwengler | 5.8 | 2.0 | 3.5 | LOS |
| | 5.8 | 3.5 | 9.5 | NLOS |
| | 3.5 | 2.7 | 11.7 | Near LOS |

The n and σ values depend on different propagation environments (e.g., downtown, urban, rural) and operating frequencies as specified in Tables 1-2 above. The values n and a are initially determined at the time of the installation according to propagation environment as specified in Table 1-2. However, since the propagation environment may change, embodiments of the coordinator (or other devices performing path loss modeling) may dynamically perform parameter estimation and update n and σ values during e.g., a training period of the received data frame, and report the new values to the coordinator 306. The value PL(d0) is generally presumed to be a fixed value for at least a period of time (corresponding to how often the path loss calculations are run during the above-described iterations or updates).

Exemplary path loss models which may be used consistent with the present disclosure are also described in co-owned and co-pending U.S. patent application Ser. No. 16/214,070 filed Dec. 8, 2018 and entitled "METHODS AND APPARATUS FOR TRANSMISSION POWER MANAGEMENT OF CITIZEN BROADBAND SERVICE," Ser. No. 16/221,951 filed Dec. 17, 2018 and entitled "PRIORITY ACCESS LICENSE HOLDER," and U.S. Pat. No. 10,368,351 issued Jul. 30, 2019 and entitled "METHODS AND APPARATUS FOR ESTIMATING CITIZENS BROADBAND SERVICE NETWORK COVERAGE," each of the foregoing incorporated herein by reference in its entirety, although other approaches may be used consistent with the present disclosure.

Per step 926, the generated path loss and other relevant data are used to generate a heat map of the venue or area being managed. This heat map in one embodiment plots signal strength or received power (estimated) for each access node (acting as a transmitter) at locations throughout the venue/area. As previously noted, the map may be rendered in two dimensions (e.g., X-Y in Cartesian coordinates), or three dimensions (e.g., X-Y-Z in Cartesian, or φ-θ-r in spherical, etc.), which accounts for differences in height for different access nodes, including relative to topographical, structural, or other features of the area/venue being managed. Grids can also be non-uniform, and can use other coordinate systems besides the illustrated Cartesian (i.e., X/Y/Z) system, such as e.g., polar or even spherical coordinates, or systems based on map projections (e.g., Mercator, Robinson, Lambert, or stereographic) in cases where the venue approximates a three-dimensional shape (e.g., a sports stadium having generally sloping sides in a "bowl" shape.

Interference areas—in one case defined as areas where two transmitters occupying the same band would ostensibly interfere if operated simultaneously due to their radiated power into that area—can be designated as well, and used as a basis for inclusion of that area (e.g., grid section) into the scheduling by the coordinator algorithms, or exclusion therefrom. For instance, a prescribed level or metric of interference (e.g., SINR or other) which meets a prescribed criterion, such as falling below a preset threshold value, may be used as a gating criterion for inclusion/exclusion from the scheduler algorithms. As a simple example, suitable high "heat-mapped" SINR for grid section No. 123, even when both RATs in a venue are operating simultaneously, may indicate that grid section No. 123 is available or "green" at all times (assuming no other changes which would significantly affect the SINR), thereby removing that grid section from inclusion in subsequent scheduling. This may be the case for example where the grid section is exposed much more strongly (e.g., due to physical proximity) to one RATs signals as opposed to the other RATs signals. See FIG. 5B discussed supra.

Moreover, a prior data regarding heat mapping and testing may be used to "pre load" the coordinator for certain operational combinations, such as between a given xNBe and a given APe. For example, it may be determined via testing at installation that the APe and the xNBe are sufficiently distant or topologically separate such that no significant interference between the two will exist under any allowed transmit power ranges, even when using identical frequencies. As such, these zones can be removed from scheduling consideration (thereby reducing complexity and management processing overhead) if desired.

Next, per step 928 of the method of FIG. 9B, a grid model or construct is selected for use within the managed area or venue. For example, in one such approach, a rectangular or square grid system such as that shown in FIGS. 4-5B is utilized. In other approaches, the hexagonal or "cell" approach of FIG. 6 is used, or alternatively the polar/radial model of FIG. 7. Yet other grid or coordinate systems and layouts will be appreciated by those of ordinary skill given this disclosure. The selected grid system is mapped onto the venue or area (in one approach, overlaid algorithmically onto the spatial heat map of the venue/area developed in step 926) such that each portion of section of the grid can be characterized in terms of heat mapping/interference. As can be appreciated, the size and scale of the grid may be varied as needed (e.g., larger scale equates to smaller grid section size), and different grid scales and/or types of grid can be used in different portions of the managed venue/area. For instance, a larger scale grid may be used in seating areas (especially those in stadium-type seating, which have an appreciable vertical angle and as such potentially quicker "roll-off" of signal properties per unit distance), whereas larger flatter areas such as a venue stage or playing field may use a smaller scale grid (larger cells or sections), especially since usage density may be significantly reduced in such areas. In one variant, grid scale or resolution is optimized based on the performance of the processing unit in the slot coordinator 306 (e.g., CPU or other processing capabilities), and other factors such as the time needed to package data information into PDUs and transmit this data to the coordinator.

Some areas of the managed area or venue may not be mapped or have a grid applied as well, such as to reduce complexity in areas where no management is determined to be needed.

Similarly, grid section or cell size may vary as a function of user density, number of proximate or included access nodes, or yet other parameters if desired.

Lastly, per step 930, the selected grid model(s) is/are applied to the managed area or venue in conjunction with the heat map. As such, in one approach, any estimated SINR or other values within a given section which meet the prescribed criterion (e.g., above a threshold for both RATs when modeling simultaneous usage) can be selectively eliminated from further evaluation—they will be "green" (i.e., unobstructed use consistent with installation configuration) until at least the next update is performed. Where the threshold is not met, those grid sections are included within management by the scheduling algorithm, such management including time-slotted allocation of use/resources within that section.

Figure 9C:
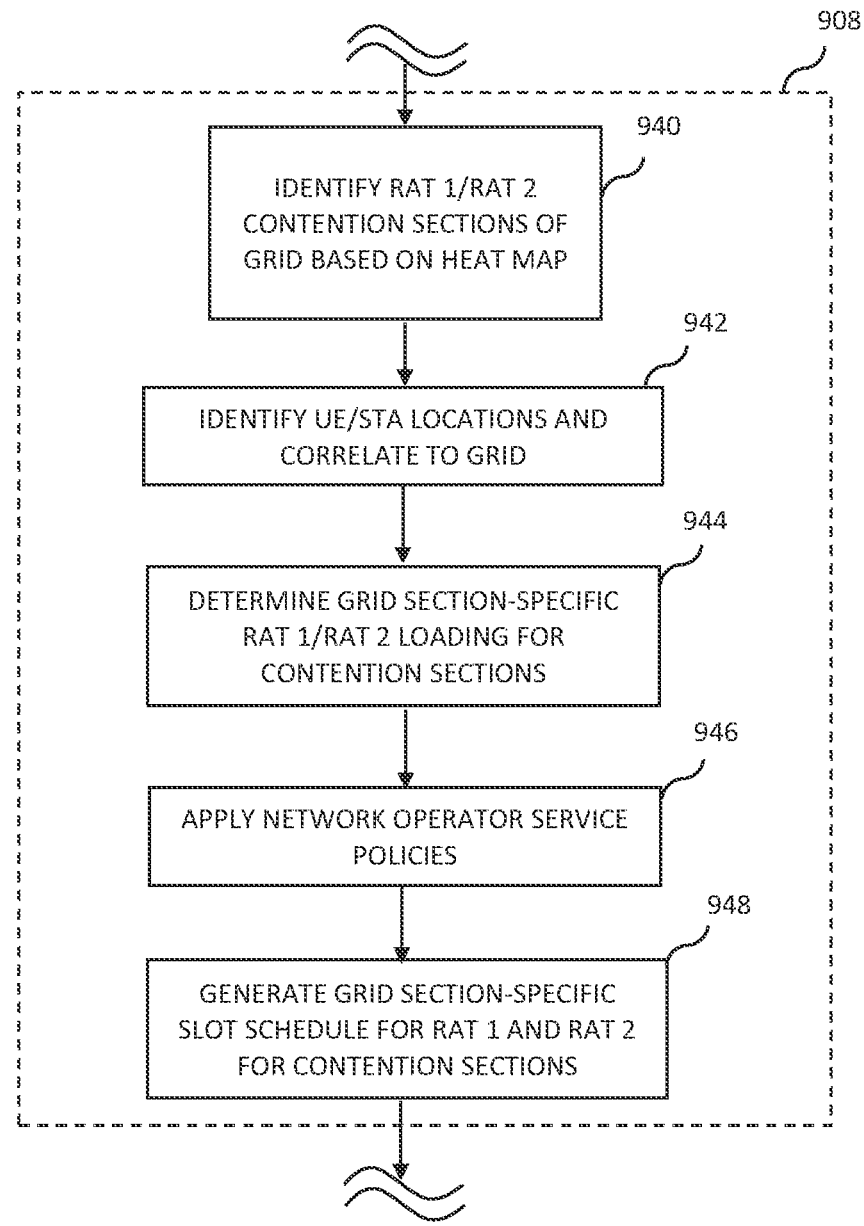
FIG. 9C is a logical flow diagram illustrating one implementation of the generalized methodology of FIG. 9, specifically relating to utilization schedule development.

FIG. 9C is a logical flow diagram illustrating one implementation of the generalized methodology of FIG. 9, specifically relating to utilization schedule development (step 908 of the exemplary method of FIG. 9).

Per step 940, one or more sections or cells of the grid discussed previously are identified as having contention (i.e., under conditions of simultaneous transmission in the same band), based on the developed heat map(s) and other factors. For example, a heat map may show RAT 1 and RAT 2 transmissions generating a low SINR within certain cells, but in other cells, there is little or at least acceptable interference between the RATs. Such cells or sections may be designated for unrestricted use (whether for DL or UL) but, depending on grid size, access node location, and other factors, this may not equate to unrestricted RAT 1 or RAT 2 DL (access node transmit) operation due to e.g., other impacted cells or sections within the footprint of a given access node not meeting this criterion. Hence, such unrestricted zones are more "corner cases" (literally and figuratively)—sections of areas or venues where due to geometry or lower density of overlapping coverage by different RATs, no contention exists.

In one variant, non-contention portions of the grid are eliminated from further management or slot scheduling, and by implication any RATs operating exclusively therein need not be managed. For instance, if the grid section or cell size is large enough to completely subsume the RF footprint of a WLAN or PAN access node or system, and no contention with another RAT such as LTE-U exists, then the WLAN/PAN node need not be managed. However, if coverage of the WLAN or PAN extends into another cell or cells, and contention exists in one or more of those other cells, then the WLAN or PAN node must be managed (at least during the period where contention would exist if simultaneous transmit operations were conducted).

Per step 942, the UE and/or STAs located within the managed area or venue at any given time can optionally be identified, such as through the APe or xNBe cell associations or even GPS or A-GPS coordinates or WLAN FTM (fine timing) data passed upstream from the UE/STA. This data lets the coordinator 306 determine which grid locations the UE/STA devices are within including for purposes of policy enforcement and/or density mapping. For example, a known UE associated with RAT 1 (e.g., LTE-U) and a given MNO operating that RAT may need to have certain policies enforced on a geo-spatial basis (as opposed to globally). Alternatively, global policy enforcement/application may be used, such as where any of the foregoing MNO's customers within the managed area/venue have the applicable policies applied, irrespective of their particular location.

Per step 944, information on RAT 1/RAT 2 loading is obtained for the relevant contention sections of the grid. Again, this may be determined in one embodiment via association of UEs/STAs with their respective access nodes; e.g., STA with an APe, and UE with a PCI for an xNBe. This may also be non-UE/STA specific if such information is not available or needed; i.e., the coordinator may merely determine how many UE are associated with an xNBe, how many STA's associated with an access node (APe), irrespective of their specific identities, since it can be presumed that simultaneous RAT 1/RAT2 attachment or connection will not occur (at least for any appreciable period) such as under direction of a connection manager process of each dual-capability UE/STA.

Per step 946, network operator-specific service policies (if any) are applied, such as where either (i) a common network operator for both RATs has policies for subscriber management (e.g., higher QoS for "gold" tier subscribers), connection management (e.g., whether to use WLAN or cellular unlicensed for a dual-capability user device, and under what circumstances), data throttling in UL and/or DL, and similar; or (ii) different network operators of different RATs (e.g., MNO or MSO-specific policies for their respective subscribers/users). Regardless of scenario (i) or (ii) above, overarching policies associated with the venue or area being managed may be imposed as well, such as for resource allocation (e.g., a given RAT's access node may only be allocated so many slots in sequence before the other RAT is allocated time resources within certain spatial boundaries or coordinates, such as grid sections), technology-based allocation (e.g., where the "fairness" of resource allocation is adjusted based on RAT 1 vs. RAT 2 speed/throughput, technology type, demand, etc.), and any other number of factors which may be considered by the coordinator 306.

Lastly, per step 948, grid section-specific slot schedules are generated by the coordinator for RAT 1 and RAT 2 access. In one variant, as referenced elsewhere herein, only the DL (access node to UE/STA) is managed by the coordinator in developing schedules, and slots are defined as a prescribed time period (e.g., measured in ms, such as 50 ms, consistent with the smaller of the two underlying time slot durations of the different RATs) and such slots are allocated as 1 or more whole slots in contiguous fashion (e.g., 1, 2, 5, etc. consecutive slots), subject to policy and fairness considerations as previously described. Moreover, for RATs which utilize dynamic time slotting such as NR and LTE, the slot coordinator's choice of time slot duration may be altered, such as via DL signaling to the relevant AP and/or NodeB adjusting the "system" time slot scheme so as to better optimize the TDD scheme currently enforced in one or more of the underlying RAT(s).

It will also be appreciated that while generally static TDD slots are designated by the coordinator 306 in some embodiments (e.g., constant time duration), the coordinator (and associated scheduler logic on the xNBe and APe devices as discussed below) may utilize non-constant or dynamic slotting itself, such as where one RAT or technology type is given a different slot duration—e.g., one which comports better with its underlying TDD/framing structure) than another RAT. Note that this is distinguished from simply allocating more uni-duration slots (which may also occur in tandem with dynamic slot length).

In the instance where a responding UE or STA is scheduled to respond to a respective access node (xNBe or APe which has previously transmitted data during its allocation) during a non-allocated period—i.e., during the other RAT's transmission slot—such behavior is allowed, as it advantageously will not interfere with the other RAT's DL transmissions due to much lower relative UE/STA transmit power. Moreover, generally speaking, the only time UE's randomly transmit is during random access procedures (e.g., 3GPP RACH), and in other cases the UL is coordinated by the underlying technology. These assumption free the exemplary embodiment of the coordinator from a much greater degree of scheduling complexity, as only access node transmission opportunities need be scheduled or managed.

For those grid sections or cells which have no contention, no schedule need be developed (at least until conditions change which trigger such need). Moreover, just because the scheduler allocates one or more slots to a RAT within a given spatial area or section, does not mean that such resources will necessarily be used. Rather, it merely provides the (allocated) RAT with an opportunity to utilize unencumbered time (and frequency) resources if needed. For instance, a given WLAN APe may have no client or STA loading, and hence the Ape controller 310 may determine that no DL transmissions from that APe are needed during the allocated slot(s). To this end, the present disclosure contemplates use in some variants of "hints" by a given RAT (which may be RAT-specific) indicating planned non-use of its allocated slots, whether directly or indirectly.

For instance, WLAN 802.11ax TWT scheduling may indicate that no STAs will be "woken" during a given slot such as via a trigger frame, and as such the resource allocation to the WLAN RAT in that area can be reallocated to the other RAT. In one configuration, the APe is configured to generate such data and pass it to the coordinator 306, such as via pass-through communications via its backhaul targeted at the coordinator's port or socket address, etc. Similarly, for LTE or NR, where dynamic TDD scheduling indicates that e.g., predominantly UL traffic from a UE will occur during its allocated slot (coordinator slot, versus LTE/NR framing slot/subslot), such data may be passed to the coordinator to enable possible reallocation of that slot to another RAT.

In various implementations, time slots assigned by the scheduler can be assigned (i) equally across RATs, (ii) based on RAT (or even individual access node) load, (iii) based on signal strength (e.g., where a weaker forward channel which supports lower theoretical data rate is compensated for by more time slots), (iv) based on prevalence of use of a given technology, (v) based on subscriber tier or subscription parameters, and/or (vi) based on actual measured data throughput, such as via a UE or STA based iPerf type of application throughput measurement process which feeds back performance data to the scheduler indirectly, number of HARQ requests (indicating poor channel conditions), etc.

It will also be recognized that the coordinator logic may be configured to "string" two or more temporal slots together for a common user (whether access node or UE/STA) so as to avoid transients and state switching to the maximum degree practicable. For example, repetitive transients turning radio chain components off and on may result in higher UE/STA power consumption.

As another alternative, grid section-by-section (or larger zone-by-zone) fairness can be imposed by the coordinator, such as where WLAN/cellular access node density varies, fairness cane be based on contention in a given grid section or zone.

In another variant the resource allocation "map" may be configured to consider or track persistent traffic; e.g., for, for constant data streams such as videos and audio, video games etc. For instance, a streaming video with certain QoS requirements being delivered via a UE connection to a 3GPP RAT may be used to alter the "fairness" balance or allocation equations between RATs, at least in certain spatial areas. If an xNBe is delivering such streaming data and other RAT uses are less demanding (whether due to low loading, lower number of user devices, or other), the allocation of time resources in the affected spatial areas at least may be adjusted to ensure meeting the QoS or similar requirements, including even preemption of time slots which would otherwise be allocated to another RAT.

It is noted that in some models, depending on grid scale and configuration, some grid cells or sections may become spatially "stranded". For instance, a given grid section No. 123 may be cleared for unscheduled (green) operation or use by both RATs; however, there is no line of sight (LOS) or other propagation path by which RF energy from a node of a RAT can access that grid section, such as where other grid sections between No. 123 and the closest serving access node for a given RAT are all "non-green" or subject to scheduling restrictions (and assuming that the node is not within No. 123 itself). Hence, an "island" of green section(s) is formed which is effectively scheduled regardless of lack of interference, since no non-scheduled transmissions can reach it (on the DL). Since UL transmissions are characteristically much weaker (and may not be modeled in the coordinator algorithms for simplicity), the section is "green" for the UE/STA (which operates only indirectly in accordance with a coordinator schedule/slot which is provided to the access node to which that particular UE/STA is communicating). As such, in one implementation, the "green" or unrestricted designation is applied only in the DL as to access nodes as previously described.

It is noted that in some embodiments, if traffic/loading is not a restricting factor, access nodes can transmit freely. However, as load increases (including to the point where contention for the common frequency medium may be an issue) the nodes should follow the scheduling issued by the coordinator. In one such variant, one or more 'trigger" load levels are specified such that the participating access nodes implement the schedule once the trigger(s) is/are reached, whereas unrestricted operation is used otherwise. In another variant, if the interference associated with a given access node (whether modeled/estimated, actually detected, or a combination thereof) hasn't increased to or above a defined threshold, the node can be allowed to transmit.

It will also be appreciated that some exemplary implementations of the methods and apparatus of the present disclosure are configured to only analyze or schedule with respect to time and space, while management of the frequency domain is left to the underlying RATs being managed. However, this approach may be overly conservative from the standpoint that one RATs ostensibly operating in the same frequency band may in fact utilize carriers or sub-carriers at different frequencies within that band than those used by the other RAT(s). Hence, sufficient frequency domain separation may exist which largely or completely obviates the need for temporal or spatial management. In effect, the management algorithms assume that if a RAT can operate within a prescribed band, it can (and will) operate in all parts of that band at one point or another, thereby potentially leading to interference between the RATS. This assumption greatly simplifies complexity of the heat maps, path loss models, and scheduling algorithms described herein (basically frequency is ignored); however, the present disclosure does in fact contemplate embodiments where at least aspects of frequency utilization by one or more RATs being managed is considered by the heat maps, path loss models and/or scheduling algorithms. For instance, in one variant, a given RAT may be passively or actively determined to be operating within only a specified portion or sub-band of the designated wider frequency band, and as such the management algorithms can be adjusted to only consider possible interference within those sub-bands (as opposed to the wider band generically). This approach enhances spectrum optimization from the standpoint that more potentially "wasted" time-frequency resources can be utilized. Stated differently, the present disclosure contemplates that the granularity of the frequency bands/sub-bands considered by the coordinator 306 to be "used" by a given RAT may be changed consistent with the underlying air interface technology. 802.11ax for example may use wider, narrower, or different swaths of spectrum as compared to say 3GPP LTE-U or NR-U, even when operating in generally the same unlicensed regions of the spectrum.

In another implementation of the disclosed methods and apparatus, a RAT-driven or RAT-dominant approach is used. In one such approach, a given (dominant or anchor) RAT provides information back to the coordinator 306, such information useful in the coordinator's determination of "green" sections or cells of the grid where the other RAT can operate (e.g., its access node(s) can transmit in DL). This may be performed e.g., for each time slot for a given device. Consider an example (see e.g., FIG. 8), where 2 APes 804a, 804b supervised by a Wi-Fi controller 810, and 2 LTE xNBes 802a, 802b are supervised by an MIME. The APes and xNBes are each installed in the example zone 406 of FIG. 4 (i.e., a larger grid "block"). In one such scenario, the slot coordinator 306 obtains "live" information from the dominant RAT (here, WLAN) such as from the Wi-Fi controller 810 relating to operation of the APes, and determines "green" or non-contention sections or cells within that zone 406 of the grid. These green sections collectively comprise an area in which some of the xNBes can transmit during the evaluated slot(s). In this example, when APe 1 804a is transmitting, only xNBe B 802b is allowed to transmit during that occupied time slot, as its relative location from AP 1 is sufficiently distant such that interference/contention is reduced (unlike xNBe A, which is more spatially proximate to APe 1 and hence has a high level of potential interference). Similarly, when APe 2 is transmitting, at the same time only xNBe A 802a has a green zone where it can transmit to users without interfering with APe 2. This way there will be no significant interference, and the time-frequency resources available to the managed area or venue will be efficiently utilized.

In reality, the "dominant" RAT may in fact be the weaker, less capable or more constrained of the two (or more) managed RATs; its needs must be considered first and the other more adaptive RAT(s) used to adjust around these identified requirements. For instance, WLAN is typically lower range, lesser throughput, and less aggressive in terms of LBT and the like than 3GPP technologies, and as such can be a good candidate for an anchor RAT.

It will also be appreciated that parameters and offsets can be selected and built into the slot coordinator algorithms 306 to determine the "green" zones for a prescribed slot time or set of slots; for example, latency and other such factors can be considered such that sufficient time exists for data to be received by the coordinator from the "dominant" RAT, processed, and data regarding available temporal slots which may be used by certain of the xNBes transmitted to those xNBes in sufficient time for them to utilize the target slot(s).

A further aspect of the above-described scheduling is that, when properly configured in terms of TDD slot period and other parameters, one or more of the underlying contention resolution or medium access protocols (e.g., LBT or CSMA-CD) can be accommodated for one or more of the RATs. Specifically, in one example, underlying LBT protocols are allowed top proceed as "normal" (i.e., as implemented by the underlying protocol such as NR-U), yet the slot coordinator function 306 is aware of the existence of such mechanisms, and can adjust slot scheduling for access nodes using such protocols to accommodate particulars of the LBT or other protocol. While medium contention ideally is substantially reduced or even non-existent during a given access node's allocated transmit windows for the zone within which it is disposed (in that either other access nodes are not scheduled to transmit during such windows, or they are sufficiently distant such that no significant contention or interference exists), it still may be the case that LBT does not complete sufficiently fast to engage in any meaningful DL transmission before the allocated slot/window closes. As such, the transmission of DL data may be deferred to the next scheduled slot (assuming it is within the LBT protocol's "timeout" parameters which might require a second LBT performance), and/or the coordinator may be configured to string multiple individual (atomic) slots together as described elsewhere herein in order to enable data transmission immediately following completion of LBT, all within the same allocated period. This type of adjustment may also be applied on a -per-RAT basis; for instance, a non-LBT RAT operating within a venue or area coincidentally with an LBT-based RAT might allocate the non-LBT RAT with fewer slots (or a lesser number of temporally contiguous slots) as compared to the other RAT which has LBT, the latter which is given more slots in sequence (even if the same as the non-LBT RAT in total).

Coordinator Apparatus—

Figure 10:
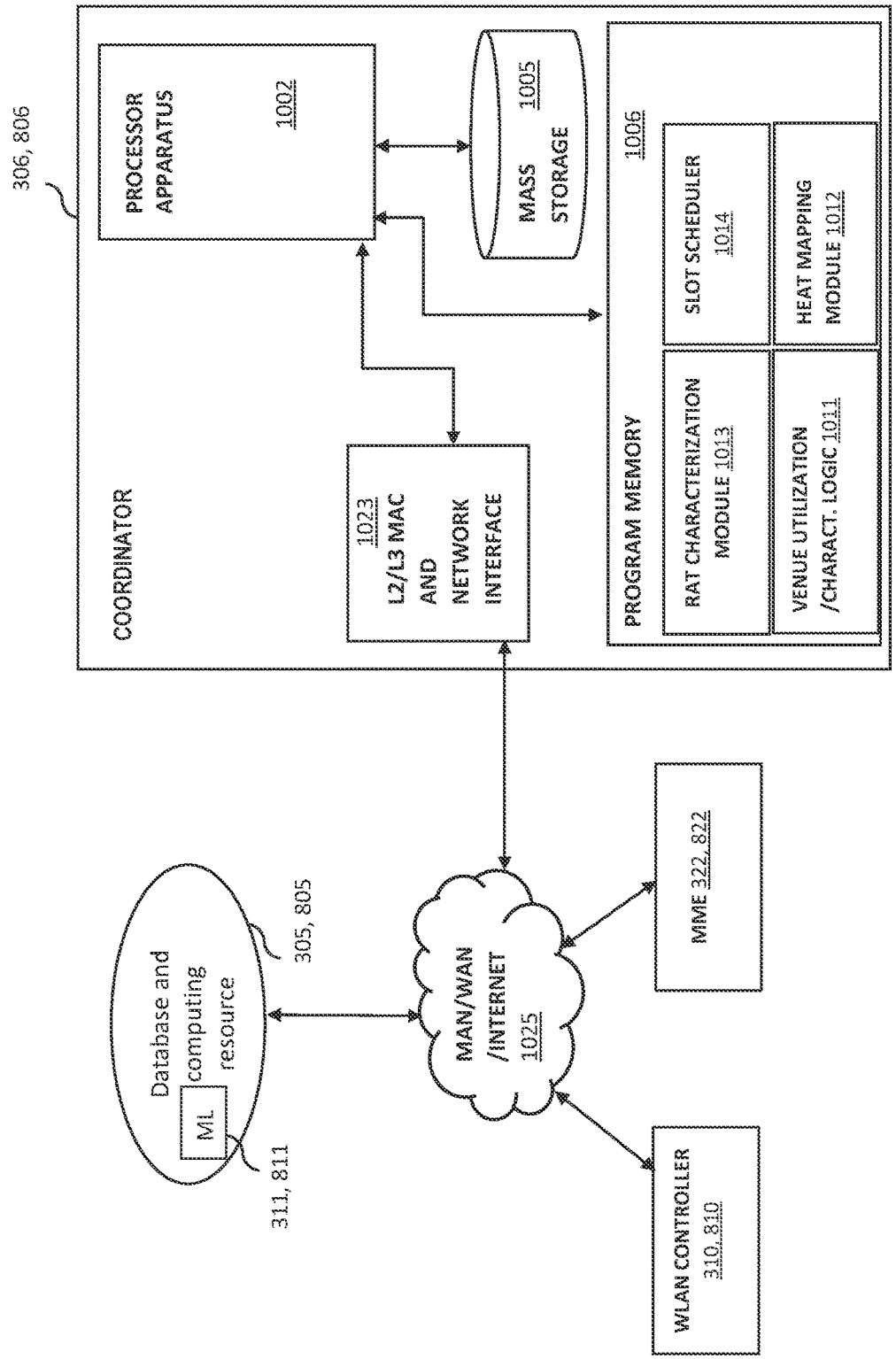
FIG. 10 is a functional block diagram illustrating one embodiment of a RAT coordinator device configured according to the disclosure.

FIG. 10 is a functional block diagram illustrating one embodiment of a RAT coordinator device configured according to the disclosure.

In one exemplary embodiment as shown, the coordinator 306, 806 includes, inter alia, a processor apparatus or subsystem 1002, a program memory module 1006, a local mass storage device 1005, and network interfaces 1023 (e.g., Layer 2/3 MAC such as GbE) for communications with the relevant MME, WLAN controller, or other entities such as an enhanced 5G AMF or other network entity fulfilling functions similar to the 4G MME).

In one embodiment, the processor apparatus 1002 may include one or more of a digital signal processor, microprocessor, field-programmable gate array, GPU, or plurality of processing components mounted on one or more substrates. The processor apparatus 1002 may also comprise an internal cache memory. In addition, the coordinator may include RAT characterization logic 1013, slot scheduler logic 1014, venue utilization and characterization logic 1011, and heat map/path loss modeling logic 1012 in the program memory which is in communication with the processing subsystem. In one example, the various logic 1011, 1012, 1013, 1014 maybe implemented as software or firmware stored on a storage device and executed on the processor 1002.

The processing subsystem 1002 is in communication with a program memory module or subsystem 1006, where the latter may include memory which may comprise, e.g., SRAM, flash and/or SDRAM (e.g., GDDR5 or GDDR6) components. The memory module 906 may implement one or more of direct memory access (DMA) type hardware, so as to facilitate data accesses as is well known in the art. The memory module of the exemplary embodiment contains one or more computer-executable instructions that are executable by the processor apparatus 1002. A mass storage device (e.g., HDD or SSD, or NAND/NOR flash or the like) 1005 is also provided as shown.

The processor apparatus 1002 is configured to execute at least one computer program stored in memory 1006 (e.g., the logical methods according to the methods of FIGS. 9-9C, herein, in the form of software or firmware that implements the various functions). Other embodiments may implement such functionality within dedicated hardware, logic, and/or specialized co-processors (not shown).

In some embodiments, the logic 1011, 1012, 1013, 1014 also utilizes memory 1006 or other storage 1005 configured to temporarily and/or locally hold a number of data relating to various data or parameter so use such as cellular PCI (physical cell identifier) values, SINR data, MSO or MNO rules, policies, access node locations and configurations, operating bands, and other data for the various APe and xNBe devices (whether alone or in cooperation with another database, such as the cloud database 305) which it services under the relevant RAT standards. In other embodiments, application program interfaces (APIs) may also reside in the internal cache or other memory 1006. Such APIs may include common network protocols or programming languages configured to enable communication between with other network entities (e.g., via API "calls" to or from the coordinator 306, 806, EPC or NG Core, APe controller 310 or other entities, such as MSO based headend control entities or processes, such as to implement desired functionality or policy changes.

xNBe Apparatus—

Figure 11:
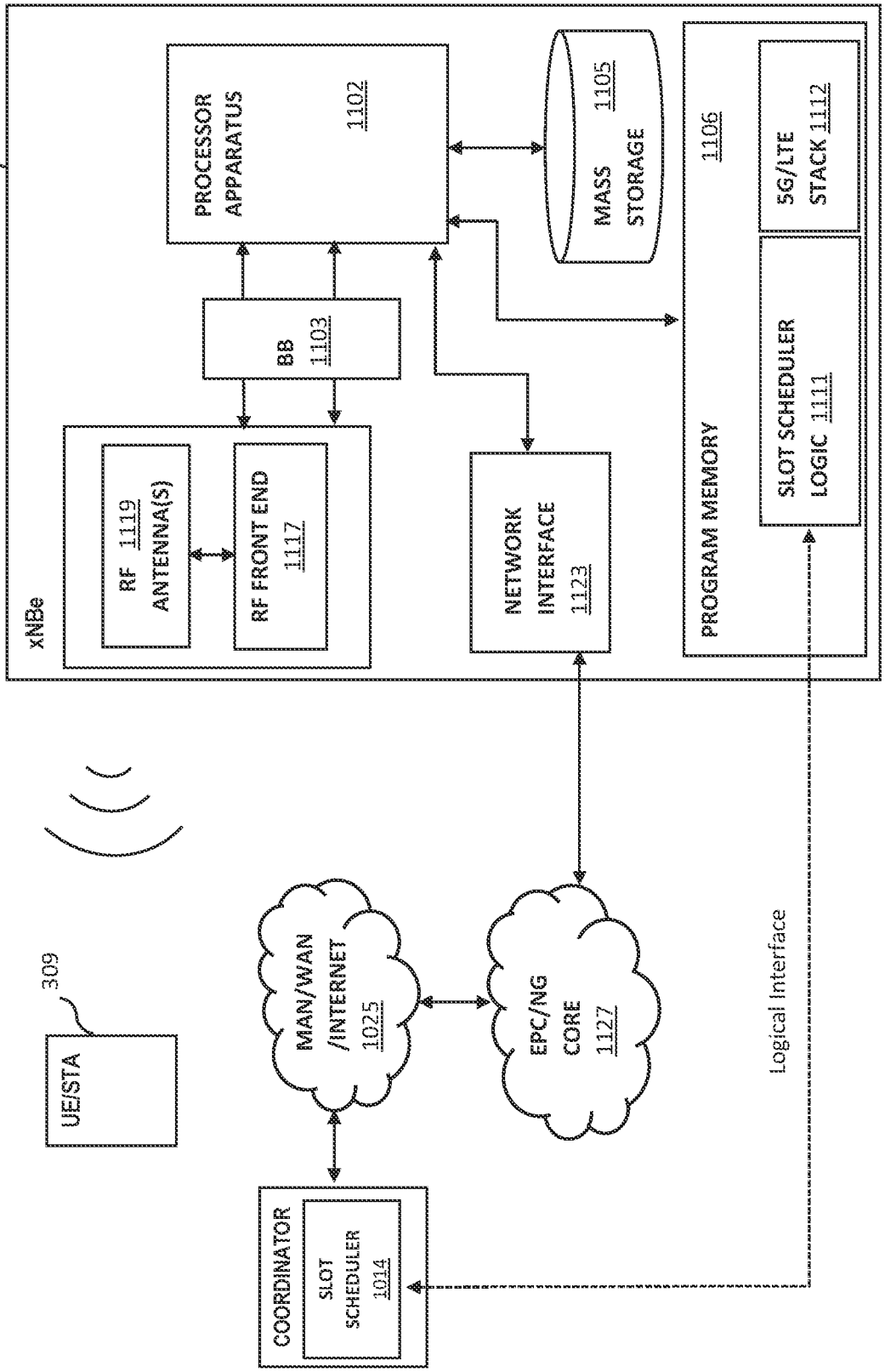
FIG. 11 is functional block diagram illustrating one embodiment of an enhanced wireless access node (e.g., 5G NR compliant enhanced gNB or 4G eNB) according to the disclosure.

FIG. 11 is functional block diagram illustrating one embodiment of an enhanced wireless access node (e.g., 5G NR compliant enhanced gNBe or 4G eNBe) according to the disclosure.

In one exemplary embodiment as shown, the base station 302, 802 includes, inter alia, a processor apparatus or subsystem 1102, a program memory module 1106, a local mass storage device 1105, and network interface(s) 1123 for communications with the relevant 4G LTE or 5G-NR RAN or other entities such as an MME or AMF described previously herein.

In one embodiment, the processor apparatus 1102 may include one or more of a digital signal processor, microprocessor, field-programmable gate array, GPU, or plurality of processing components mounted on one or more substrates. The processor apparatus 1102 may also comprise an internal cache memory.

Baseband processing logic in support of the RF front end components 1117 is also provided, such as in the form of a 4G/5G chipset.

In addition, the xNBe may include slot scheduler logic 1111 in the program memory which is in communication with the processing subsystem (as well as a 4G/5G stack 1112 to implement other 4G and 5G NR related functions of the xNBe). In one example, the scheduler logic 1111 maybe implemented as software or firmware stored on a storage device and executed on the processor 1102.

The processing subsystem 1102 is in communication with a program memory module or subsystem 1106, where the latter may include memory which may comprise, e.g., SRAM, flash and/or SDRAM (e.g., GDDR5 or GDDR6) components. The memory module 1106 may implement one or more of direct memory access (DMA) type hardware, so as to facilitate data accesses as is well known in the art. The memory module of the exemplary embodiment contains one or more computer-executable instructions that are executable by the processor apparatus 1102. A mass storage device (e.g., HDD or SSD, or NAND/NOR flash or the like) 1105 is also provided as shown.

The processor apparatus 1102 is configured to execute at least one computer program stored in memory 1106 (e.g., the applicable logic in support of the scheduler module and implementation of the schedule and policies, according to the methods of FIGS. 9-9C, herein, in the form of software or firmware that implements the various functions). Other embodiments may implement such functionality within dedicated hardware, logic, and/or specialized co-processors (not shown).

In some embodiments, the logic 1111 also utilizes memory 1106 or other storage 1105 configured to temporarily and/or locally hold a number of data relating to the various data such as individual UE identification and capability data, user subscription or service level/SLA data, UE-measured RF readings (which can be passed up to the coordinator 306 such as to provide actual in situ power or interference measurements which may be useful in characterizing the managed area/venue and RF channels between the UE and xNBe), RF bands, data on dynamic TDD usage or other functions of possible interest to the coordinator, measured DL or UL throughput (such as from an iPerf or other client resident on a served UE), and/or other data (whether alone or in cooperation with another database).

In other embodiments, application program interfaces (APIs) may also reside in the internal cache or other memory 1106. Such APIs may include common network protocols or programming languages configured to enable communication between with other network entities (e.g., via API "calls" to or from xNBe to obtain required or desired data, such as where the coordinator makes API calls directly or indirectly to the xNBe in order to obtain configuration updates, UE association data, RF environment measurements, or other).

It will also be appreciated that while described primarily with respect to a unitary gNBe-CUe entity or device 1100 as shown in FIG. 11, the present disclosure is in no way limited to such architectures. For example, in the 5G NR context, the xNBe and techniques described herein may be implemented as part of a distributed or dis-aggregated or distributed CUe entity (e.g., one wherein the user plane and control plane functions of the CUe are dis-aggregated or distributed across two or more entities such as a CUe-C(control) and CUe-U (user)), and/or other functional divisions are employed.

It is also noted that heterogeneous architectures of eNBs or femtocells (i.e., E-UTRAN LTE/LTE-A Node B's or base stations) and gNBes may be utilized consistent with the methods and architectures described herein. For instance, a given DUe may act (i) solely as a DUe (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-colocated with the eNB or femtocell, but still provide NR coverage within the macrocell coverage area.

In the 5G NR model, the DU(s) comprise logical nodes that each may include varying subsets of the gNB functions, depending on the functional split option. DU operation is controlled by the CU (and ultimately for some functions by the NG Core). Split options between the DUe and CUe in the present disclosure may include for example:

Option 1 (RRC/PCDP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

Under Option 1 (RRC/PDCP split), the RRC (radio resource control) is in the CUe while PDCP (packet data convergence protocol), RLC (radio link control), MAC, physical layer (PHY) and RF are kept in the DUe, thereby maintaining the entire user plane in the distributed unit.

Under Option 2 (PDCP/RLC split), there are two possible variants: (i) RRC, PDCP maintained in the CUe, while RLC, MAC, physical layer and RF are in the DU(s); and (ii) RRC, PDCP in the CUe (with split user plane and control plane stacks), and RLC, MAC, physical layer and RF in the DUe's.

Under Option 3 (Intra RLC Split), two splits are possible: (i) split based on ARQ; and (ii) split based on TX RLC and RX RLC.

Under Option 4 (RLC-MAC split), RRC, PDCP, and RLC are maintained in the CUe, while MAC, physical layer, and RF are maintained in the DUe's.

Under Option 5 (Intra-MAC split), RF, physical layer and lower part of the MAC layer (Low-MAC) are in the DUe's, while the higher part of the MAC layer (High-MAC), RLC and PDCP are in the CUe.

Under Option 6 (MAC-PHY split), the MAC and upper layers are in the CUe, while the PHY layer and RF are in the DUe's. The interface between the CUe and DUe's carries data, configuration, and scheduling-related information (e.g. Modulation and Coding Scheme or MCS, layer mapping, beamforming and antenna configuration, radio and resource block allocation, etc.) as well as measurements.

Under Option 7 (Intra-PHY split), different sub-options for UL (uplink) and DL downlink) may occur independently. For example, in the UL, FFT (Fast Fourier Transform) and CP removal may reside in the DUe's, while remaining functions reside in the CUe. In the DL, iFFT and CP addition may reside in the DUe, while the remainder of the PHY resides in the CUe.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as CoMP, MIMO, load balancing, and mobility.

The foregoing split options are intended to enable flexible hardware implementations which allow scalable cost-effective solutions, as well as coordination for e.g., performance features, load management, and real-time performance optimization including changes to the LTE/NR detection logic described above. Moreover configurable functional splits enable dynamic adaptation to various use cases and operational scenarios. Factors considered in determining how/when to implement such options can include for example: (i) QoS requirements for offered services (e.g. low latency, high throughput); (ii) support of requirements for user density and load demand per given geographical area (which may affect RAN coordination); (iii) availability of transport and backhaul networks with different performance levels (including membership in IABs); (iv) application type (e.g. real-time or non-real time); (v) feature requirements at the Radio Network level (e.g. Carrier Aggregation), and (vi) power conservation at UEes.

As such, the slot scheduler logic 1111 for example may be implemented only in the CUe, with "dumb" DU radio devices controlled thereby in terms of coordination with other RATs. Conversely, each individual DU within a venue or area (or subset of DU) may be "enhanced" to operate with slot scheduling and related logic in support of the coordinator 306.

APe Apparatus—

Figure 12:
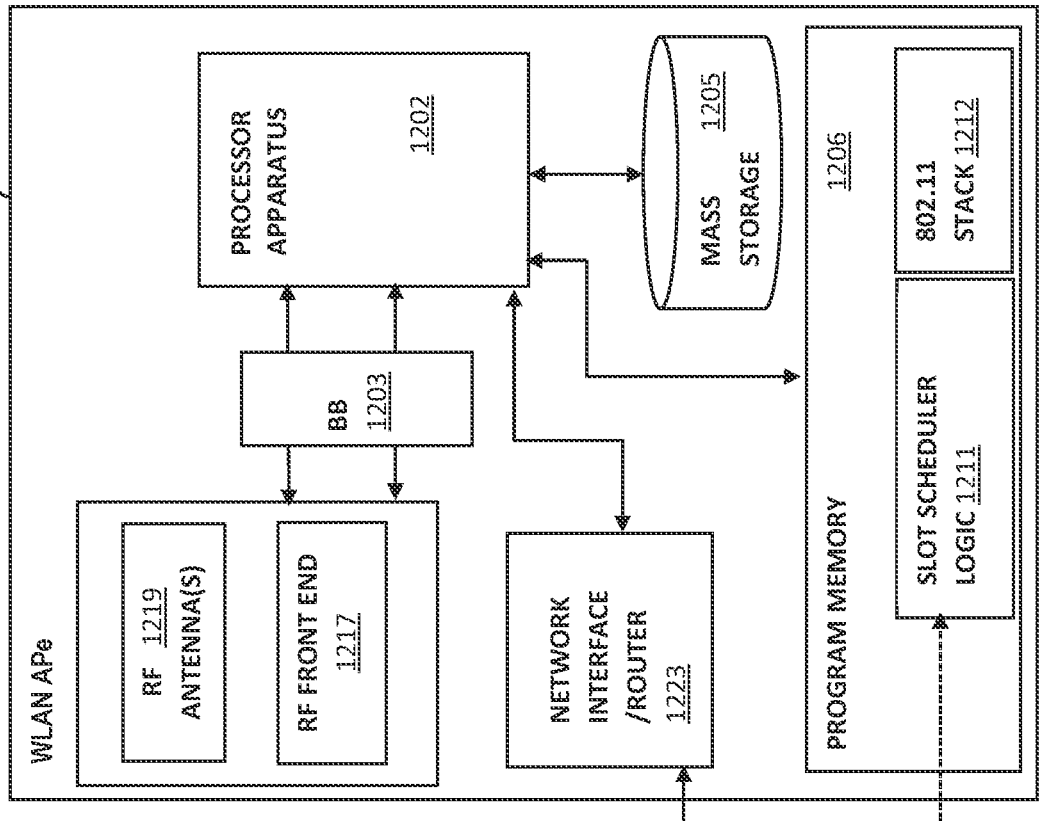
FIG. 12 is functional block diagram illustrating one embodiment of an enhanced wireless access node (e.g., WLAN AP) according to the disclosure.
Figure 12:
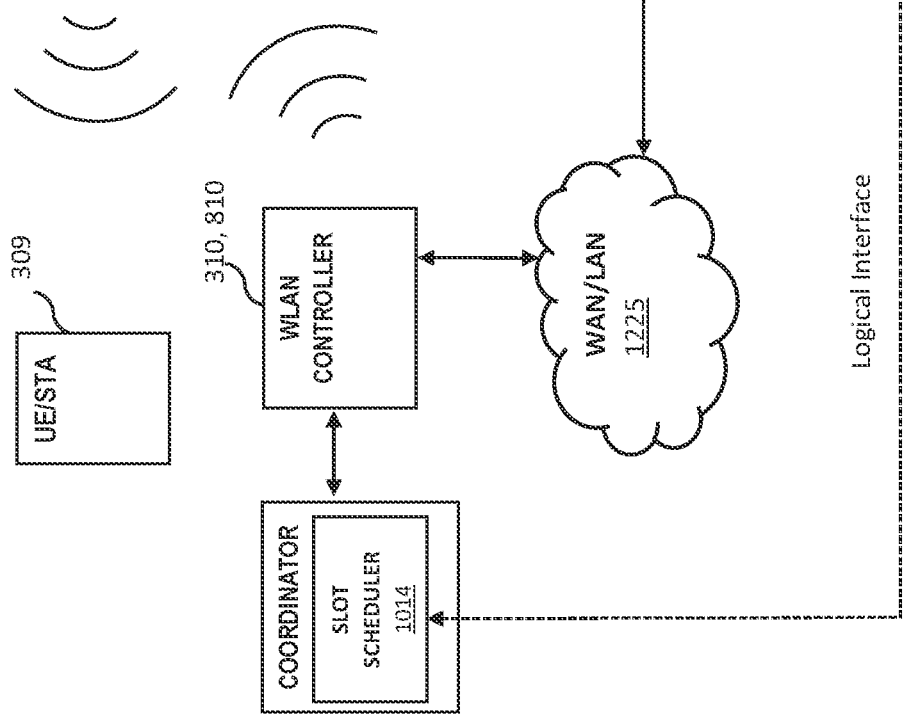

FIG. 12 is functional block diagram illustrating one embodiment of an enhanced wireless access node (e.g., WLAN AP) according to the disclosure.

In one exemplary embodiment as shown, the APe 304, 804 includes, inter alia, a processor apparatus or subsystem 1202, a program memory module 1206, a local mass storage device 1205, and network interface(s) and router function 1223 for communications with the relevant WLAN controller 310, 810 as described previously herein.

In one embodiment, the processor apparatus 1202 may include one or more of a digital signal processor, microprocessor, field-programmable gate array, GPU, or plurality of processing components mounted on one or more substrates. The processor apparatus 1202 may also comprise an internal cache memory. Baseband processing logic in support of the RF front end components 1217 is also provided, such as in the form of an 802.11ax chipset.

In addition, the APe may include slot scheduler logic 1211 in the program memory which is in communication with the processing subsystem (as well as an 802.11 stack 1212 to implement other WLAN-related functions of the APe, such as TWT). In one example, the scheduler logic 1211 maybe implemented as software or firmware stored on a storage device and executed on the processor 1202.

The processing subsystem 1202 is in communication with a program memory module or subsystem 1206, where the latter may include memory which may comprise, e.g., SRAM, flash and/or SDRAM (e.g., GDDR5 or GDDR6) components. The memory module 1206 may implement one or more of direct memory access (DMA) type hardware, so as to facilitate data accesses as is well known in the art. The memory module of the exemplary embodiment contains one or more computer-executable instructions that are executable by the processor apparatus 1202. A mass storage device (e.g., HDD or SSD, or NAND/NOR flash or the like) 1205 is also provided as shown.

The processor apparatus 1202 is configured to execute at least one computer program stored in memory 1206 (e.g., the applicable logic in support of the scheduler module and implementation of the schedule and policies, according to the methods of FIGS. 9-9C, herein, in the form of software or firmware that implements the various functions). Other embodiments may implement such functionality within dedicated hardware, logic, and/or specialized co-processors (not shown).

In some embodiments, the logic 1211 also utilizes memory 1206 or other storage 1205 configured to temporarily and/or locally hold a number of data relating to the various data such as individual STA identification and capability data, BSSID data, user subscription or service level/SLA data (although this may be disposed at the controller 310, 810 or other entity), STA-measured RF readings (which can be passed up to the coordinator 306 such as to provide actual in situ power or interference measurements which may be useful in characterizing the managed area/venue and RF channels between the STA and APe), RF bands, data on TWT usage or other functions of possible interest to the coordinator, measured DL or UL throughput (such as from an iPerf or other client resident on a served STA), and/or other data (whether alone or in cooperation with another database).

In other embodiments, application program interfaces (APIs) may also reside in the internal cache or other memory 1206. Such APIs may include common network protocols or programming languages configured to enable communication between with other network entities (e.g., via API "calls" to or from the APe to obtain required or desired data, such as where the coordinator makes API calls directly or indirectly to the APe in order to obtain configuration updates, STA association data, RF environment measurements, or other).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized wireless access node configured for use within a wireless network and configured for wireless communication with a plurality of computerized user devices and at least a computerized network node, the computerized wireless access node comprising:

processor apparatus;

wireless interface apparatus in data communication with the processor apparatus and configured to transmit and receive wireless signals in one or more radio frequency (RF) bands; and computerized logic in data communication with the processor apparatus and configured to, when executed, cause the computerized wireless access node to:

receive at least one data element from the computerized network node;

process the received at least one data element to produce information facilitating scheduling of at least transmissions by the wireless interface apparatus, the scheduling being in addition to scheduling generated by a wireless interface protocol used by the wireless interface apparatus; and utilize the information in order to control at least one transmission of wireless signals from the wireless interface apparatus.

2. The computerized wireless access node of claim 1, wherein the scheduling generated by the wireless interface protocol used by the wireless interface apparatus comprises TDD (time division duplex) scheduling generated by a scheduler process of a wireless chipset of the computerized wireless access node.

3. The computerized wireless access node of claim 1, wherein:

the received at least one data element comprises data generated based on a schedule of transmissions from at least one access node within another wireless access node operational within a wireless network using a different radio area technology (RAT) than a RAT used by the wireless interface apparatus.

4. A method of coordinating operation of first and second wireless radio access technologies (RATs) within a prescribed area or venue, the method comprising:

characterizing each of the first and second wireless RATs within the prescribed area or venue;

characterizing the prescribed area or venue;

generating a time-based schedule for the prescribed area or venue; and applying the time-based schedule to at least one of the first wireless RAT or the second wireless RAT such that at least a portion of at least one of contention or interference is avoided within one or more spatial regions of the prescribed area or venue.

5. The method of claim 4, wherein the characterizing of each of the first and second wireless RATs within the prescribed area or venue comprises:

determining a RAT type of each of the first and second wireless RATs;

obtaining information relating to access nodes in data communication with the first and second wireless RATs, respectively;

determining one or more network operators associated with the access nodes, respectively; and identifying one or more policies associated with the one or more network operators, respectively.

6. The method of claim 5, wherein the determining of the one or more network operators associated with the access nodes, respectively comprises:

determining a first portion of the access nodes are managed by a cable multiple systems operator (MSO) providing wireless local-area network (WLAN) coverage to at least a first portion of the prescribed area or venue; and determining a second portion of the access nodes are managed by a mobile network operator (MNO) providing unlicensed cellular coverage to at least a second portion of the prescribed area or venue.

7. The method of claim 4, wherein the characterizing of the prescribed area or venue comprises:

selecting a first model for the prescribed area or venue, the first model indicative of a plurality of RF propagation characteristics for various RAT signals within the prescribed area or venue;

correlating locations of access nodes respectively associated with the first and second wireless RATs to locations within the first model;

selecting a second model relating to a heat map;

selecting a third model relating to a grid or coordinate system; and applying the second and third models to the first model, wherein the applying of the second and third models to the first model comprises algorithmically overlaying on to a spatial heat map of the prescribed area or venue to enable characterization of each portion of section of a grid of the prescribed area or venue in terms of at least one of heat mapping or interference.

8. The method of claim 7, wherein the generating of the time-based schedule for the prescribed area or venue comprises:

based on the heat map, identifying the one or more spatial regions of the prescribed area or venue as having at least one of the contention or the interference between the first and second wireless RATs;

obtaining data relating to grid section-specific loading within the one or more spatial regions; and based on the data relating to the grid section-specific loading, generating grid section-specific slot schedule for the one or more spatial regions.

9. The method of claim 8, wherein the identifying of the one or more spatial regions of the prescribed area or venue as having the at least one of the contention or the interference comprises identifying from the heat map that transmissions from the first and second wireless RATs are generating a signal to interference and noise ratio (SINR) below a prescribed level within certain cells.

10. The method of claim 9, further comprising:

identifying respective locations of user equipment (UE) within the prescribed area or venue; and correlating the respective locations of the UE with the grid of the prescribed area or venue;

wherein the generating of the grid section-specific slot schedule is based on the correlating of the respective locations of the UE with the grid to enable at least one of (i) policy enforcement or (ii) density mapping.

11. The method of claim 9, further comprising determining one or more network operator service policies;

wherein the generating of the grid section-specific slot schedule is based on the one or more network operator service policies.

12. The method of claim 7, wherein the generating of the time-based schedule for the prescribed area or venue comprises:

identifying one or more second spatial regions where at least one of contention or interference is below a prescribed threshold; and excluding the identified one or more second spatial regions in the generating of the time-based schedule.

13. A system architecture, the system architecture comprises:

at least two radio area technologies (RATs); and a slot coordinator apparatus configured to:

impose a temporo-spatial access scheme on at least one of the at least two RATs in order to enhance spectral use efficiency within a prescribed area or venue; and utilize one or more computer-generated heat maps generated for the prescribed area or venue to model a spatial grid or overlay within which the temporo-spatial access scheme is imposed.

14. The system architecture of claim 13, wherein the at least two RATs comprise (i) at least one of a 3GPP (Third Generation Partnership Project) LTE (Long Term Evolution)

technology or a 3GPP 5G NR (Fifth Generation New Radio) technology, and (ii) a Wi-Fi (IEEE Std. 802.11) based technology.

15. The system architecture of claim 13, wherein the imposition of the temporo-spatial access scheme causes the at least two RATs to respectively operate in one of an uplink (UL) or downlink (DL) within time and spatial coordinates as determined by computerized logic of the slot coordinator apparatus so as to avoid contention for frequency resources.

16. The system architecture of claim 13, wherein the at least two RATs comprise at least two homogeneous RATs, the at least two homogeneous RATs being uncoordinated and operated by different network operators having one or more service level or other sharing arrangements for the prescribed area or venue.

17. A system architecture, the system architecture comprises:
    at least two radio area technologies (RATs); and
    a slot coordinator apparatus configured to impose a temporo-spatial access scheme on at least one of the at least two RATs in order to enhance spectral use efficiency within a prescribed area or venue;
    wherein:
    the at least two RATs comprise at least two heterogeneous RATs;
    users of the at least two heterogeneous RATs are associated with a common network operator or service provider; and
    the common network operator comprises a cable multiple systems operator (MSO), and at least one of the at least two heterogeneous RATs are backhauled to at least a core network of the MSO by one or more data over cable service interface specification (DOCSIS) infrastructure.

18. The system architecture of claim 17, wherein the at least two RATs comprise at least two homogeneous RATs, the at least two homogeneous RATs being uncoordinated and operated by different network operators having one or more service level or other sharing arrangements for the prescribed area or venue.

19. A system architecture, the system architecture comprises:
    at least two radio area technologies (RATs);
    a slot coordinator apparatus configured to impose a temporo-spatial access scheme on at least one of the at least two RATs in order to enhance spectral use efficiency within a prescribed area or venue; and
    one or more cloud-based machine learning (ML) processes used to support one or more operations of the slot coordinator apparatus substantially in real time, the one or more cloud-based ML processes configured to utilize at least historical data to determine use patterns such as changes in user spatial density and load;
    wherein output of the one or more cloud-based ML processes is used by the slot coordinator apparatus in real-time allocations of resources so as to maximize the spectral use efficiency.

20. The system architecture of claim 19, wherein the at least two RATs comprise at least two homogeneous RATs, the at least two homogeneous RATs being uncoordinated and operated by different network operators having one or more service level or other sharing arrangements for the prescribed area or venue.

* * * * *